(12) United States Patent
Kurita et al.

(10) Patent No.: US 7,356,827 B2
(45) Date of Patent: Apr. 8, 2008

(54) DISK CARTRIDGE

(75) Inventors: Kazuhito Kurita, Kanagawa (JP);
Mikinori Matsuda, Kanagawa (JP);
Tokio Kanada, Kanagawa (JP);
Tadami Nakamura, Saitama (JP)

(73) Assignee: Sony Corporation, Tokyo (JP)

( * ) Notice: Subject to any disclaimer, the term of this patent is extended or adjusted under 35 U.S.C. 154(b) by 381 days.

(21) Appl. No.: 10/528,669

(22) PCT Filed: Jul. 23, 2004

(86) PCT No.: PCT/JP2004/010515

§ 371 (c)(1),
(2), (4) Date: Mar. 22, 2005

(87) PCT Pub. No.: WO2005/010885

PCT Pub. Date: Feb. 3, 2005

(65) Prior Publication Data

US 2006/0010455 A1 Jan. 12, 2006

(30) Foreign Application Priority Data

| Jul. 28, 2003 | (JP) | ............................. 2003-281391 |
| Jul. 28, 2003 | (JP) | ............................. 2003-281395 |
| May 10, 2004 | (JP) | ............................. 2004-140491 |

(51) Int. Cl.
*G11B 23/03* (2006.01)
(52) U.S. Cl. ..................... 720/728; 720/725
(58) Field of Classification Search ......... 720/725–744
See application file for complete search history.

(56) References Cited

U.S. PATENT DOCUMENTS

| 5,930,090 | A  * | 7/1999  | Schick et al. ............... 360/133 |
| 6,122,141 | A  * | 9/2000  | Muse ....................... 360/99.06 |
| 6,256,168 | B1 * | 7/2001  | Hales et al. ................ 360/133 |
| 6,298,034 | B1 * | 10/2001 | Hashimoto .................. 720/740 |
| 6,377,538 | B1 * | 4/2002  | d'Alayer de Costemore d'Arc ........................................................... 720/730 |
| 6,526,018 | B1 * | 2/2003  | Kurozuka et al. .......... 720/728 |
| 6,600,718 | B2 * | 7/2003  | Shimada et al. ............ 720/655 |
| 6,754,167 | B1 * | 6/2004  | Nakashima ................. 720/728 |
| 6,985,331 | B2 * | 1/2006  | Oishi et al. ................. 360/133 |
| 2002/0060969 | A1 * | 5/2002 | Shimazaki et al. ........ 369/77.2 |
| 2002/0126614 | A1 * | 9/2002 | Bagnell et al. ............ 369/77.2 |
| 2002/0159374 | A1 * | 10/2002 | Kurozuka et al. ......... 369/77.2 |
| 2003/0095358 | A1 * | 5/2003 | Oishi et al. ................. 360/133 |
| 2004/0013082 | A1 * | 1/2004 | Hayashi ..................... 369/291 |

(Continued)

FOREIGN PATENT DOCUMENTS

EP      1001422 A2 * 5/2000

(Continued)

*Primary Examiner*—William J Klimowicz
(74) *Attorney, Agent, or Firm*—Bell, Boyd & Lloyd LLP

(57) ABSTRACT

A disc cartridge is provided. The disc cartridge includes an optical disc and a main cartridge body unit rotatably housing the optical disc. A lateral surface of the main cartridge body unit as an inserting end of the main cartridge body unit into the recording and/or reproducing apparatus is a semicircular arcuate section having the center of the optical disc accommodated in the main cartridge body unit as center. The direction of insertion of the main cartridge body unit into the recording and/or reproducing apparatus may be discriminated readily to achieve smooth loading.

12 Claims, 21 Drawing Sheets

U.S. PATENT DOCUMENTS

2006/0174258 A1* 8/2006 Kurita et al. ................ 720/740
2006/0179449 A1* 8/2006 Kurita et al. ................ 720/738

FOREIGN PATENT DOCUMENTS

| | | | |
|---|---|---|---|
| EP | 1227488 A1 * | 7/2002 | |
| EP | 1477984 A2 * | 11/2004 | |
| JP | 7006493 | 1/1995 | |
| JP | 10334630 A * | 12/1998 | |
| JP | 11353845 | 12/1999 | |
| JP | 2000156059 A * | 6/2000 | |
| JP | 2000156061 A * | 6/2000 | |
| JP | 2001035118 A * | 2/2001 | |
| JP | 2001357650 | 12/2001 | |
| JP | 2002032949 | 1/2002 | |
| JP | 2002056601 A * | 2/2002 | |
| JP | 2002367268 | 12/2002 | |
| JP | 2003030949 A * | 1/2003 | |

* cited by examiner

DISK CARTRIDGE

CROSS REFERENCE TO RELATED APPLICATIONS

The present application claims priority to Japanese Patent Application No. 2003-281395, filed on Jul. 28, 2003, Japanese Patent Application No. 2003-281391, filed on Jul. 28, 2003, and Japanese Patent Application No. 2004-140491, filed on May 10, 2004, the disclosures of which in entirety are incorporated by reference herein.

BACKGROUND OF THE INVENTION

The present invention relates to a disc cartridge having a disc-shaped recording medium, such as an optical disc held therein.

Up to now, a disc cartridge, having a disc-shaped recording medium, such as an optical disc, rotatably housed therein, and which is loaded on a disc recording and/or reproducing apparatus, is housed therein as a disc-shaped recording medium, has been in use extensively. This sort of the disc cartridge, comprising a disc-shaped recording medium, housed in a main cartridge body unit, can be loaded/unloaded for the disc recording and/or reproducing apparatus, with the disc-shaped recording medium in a protected state.

As this sort of the disc cartridge, such a one comprising a disc-shaped recording medium, housed for rotation in a rectangular-shaped main cartridge body unit, is in widespread use.

Meanwhile, among the commercially available disc-shaped recording mediums, housed in disc cartridges, there are those common in size but different in the recording and/or reproducing system. The disc-shaped recording mediums, different in the recording and/or reproducing system may not be recorded and/or reproduced on a common recording and/or reproducing apparatus with compatibility. The disc cartridge, housing a disc-shaped recording medium, substantially common in size, also has a outer substantially common outer shape. That is, a disc cartridge substantially common in outer shape but different in the recording and/or reproducing system is now presented to the market. Among these commercially available disc cartridges, there are those having discriminating parts for discriminating the sort of the disc-shaped recording mediums housed therein. These discriminating parts are mechanically or electrically discernible, using a cartridge discriminating unit provided to the recording and/or reproducing apparatus carrying the disc cartridge, but are difficult to discern readily on visual observation.

Thus, such a disc cartridge, in which the sort of the disc-shaped recording medium, housed therein, may readily be discerned based on the outer shape of a main cartridge body unit, has been proposed. An example of this disc cartridge is disclosed in the Japanese laid-Open Patent Publication H11-353845 (Patent Publication 1).

In the disc cartridge, disclosed in the Patent Publication 1, the inserting end into the recording and/or reproducing apparatus has a substantially arcuate lateral side as an inserting end to the recording and/or reproducing apparatus, so that the inserting direction into the recording and/or reproducing apparatus may readily be identified, while the mistaken insertion into the recording and/or reproducing apparatus may readily be prevented from occurring. In addition, since the lateral side is arcuate-shaped, the disc cartridge may be smaller in size than a rectangular-shaped disc cartridge.

In the disc cartridge, described in this Patent Publication 1, the lateral side of the main cartridge body unit is arcuately-shaped. However, the disc cartridge is not reduced in size in keeping with the disc-shaped recording medium housed therein.

Moreover, the rectangular-shaped disc cartridge, so far used extensively, may be inserted into or detached from a cartridge supporting part of a cartridge holder provided to the recording and/or reproducing apparatus. That is, the rectangular-shaped disc cartridge may be loaded or unloaded in stability by causing its movement along an inserting guide part provided to the recording and/or reproducing apparatus.

If, with the rectangular-shaped disc cartridge, an engagement recess, engaged by a mating engagement portion of the ejection unit provided to the recording and/or reproducing apparatus, is provided, it is naturally provided in a flat surface parallel to the inserting direction.

If the inserting end of a disc cartridge into the recording and/or reproducing apparatus is arcuately-shaped, as in the disc cartridge shown in the Patent publication 1, for reducing the size of the disc cartridge in keeping with the disc-shaped recording medium accommodated therein, it may be difficult to provide the engagement recess, engaged by a mating engagement portion of the ejection unit provided to the recording and/or reproducing apparatus, in a flat surface extending parallel to the inserting direction. That is, the engagement recess, which enables an ejection unit to be operated in stability during the operation of inserting the disc cartridge into the recording and/or reproducing apparatus, it may become impossible to provide the recess in the flat surface extending parallel to the inserting direction, as a result of the attempt to reduce the size of the disc cartridge.

In a disc cartridge in which, for further reducing its size, an area approximately one-half of the inserting end into the recording and/or reproducing apparatus, it becomes impossible to provide the engagement recess, engaged by the mating engagement portion of the ejection unit, in the flat lateral surface extending parallel to the inserting direction.

SUMMARY OF THE INVENTION

The present invention relates to a disc cartridge, having a disc-shaped recording medium, such as an optical disc held therein.

The present invention provides in an embodiment a disc cartridge which may be further reduced in size keeping with the disc housed therein.

The present invention provides in an embodiment a disc cartridge which may be readily smoothly loaded on a recording and/or reproducing apparatus.

The present invention provides in an embodiment a disc cartridge in which a part of a signal recording area of a disc housed within the main cartridge body unit may reliably be exposed to outside across the inner and outer rims of the disc.

The present invention provides in an embodiment a disc cartridge in which a recording and/or reproducing aperture for exposing a part of the disc housed within the main cartridge body unit may reliably be opened/closed.

The present invention provides in an embodiment a disc cartridge in which a shutter unit for opening/closing the recording and/or reproducing aperture provided to the main cartridge body unit may be moved in stability.

The present invention provides in an embodiment a disc cartridge in which, while the size thereof is further reduced in keeping with the disc accommodated therein, the disc loaded on the recording and/or reproducing apparatus may reliably be ejected.

The present invention provides in an embodiment a disc cartridge in which engagement with the ejection unit provided to the recording and/or reproducing apparatus may be reliably achieved to enable stable ejection.

The present invention provides in an embodiment a disc cartridge which may reliably be loaded on the recording and/or reproducing apparatus.

The present invention provides a disc cartridge comprising a disc, and a main cartridge body unit having the disc rotatably housed therein, in which one lateral surface of the main cartridge body unit is a substantially semicircular arcuate section having the center of the disc housed in the main cartridge body unit as center.

With the present disc cartridge, one lateral surface of the main cartridge body unit is formed as a substantially semicircular arcuate section having the center of the disc accommodated in the main cartridge body unit as a center, so that at least one lateral side of the disc cartridge is of a size substantially proximate to the semicircle of the disc accommodated therein, thus achieving further size reduction of the main cartridge body unit.

the arcuate section provided to the main cartridge body unit is formed on an inserting side of the main cartridge body unit into a recording andlor reproducing apparatus. Moreover, the back side of the main cartridge body unit opposite to the inserting end thereof formed as the arcuate section is a curved section having a curvature smaller than that of the arcuate section.

With this disc cartridge, in which the inserting end thereof into the recording and/or reproducing apparatus is formed as a substantially arcuate section, the direction of insertion into the recording and/or reproducing apparatus may be discerned readily, thereby positively prohibiting mistaken insertion.

In addition, since the inserting end of the disc cartridge according to the present invention is formed as a semicircular arcuate section, the disc cartridge may be smoothly inserted over a wide angular extent into the cartridge loading/unloading opening provided to the recording and/or reproducing apparatus.

The main cartridge body unit includes a recording and/or reproducing aperture for exposing at least a portion of the signal recording area of the disc to outside across the inner and outer rims of the disc. The recording and/or reproducing aperture is formed for being opened in a lateral side of the main cartridge body unit other than the lateral side formed as the arcuate section. A shutter unit for opening/closing the recording and/or reproducing aperture is movably mounted to the main cartridge body unit. The shutter unit is moved along a lateral side of the main cartridge body unit other than the arcuate section of the main cartridge body unit for opening/closing the recording and/or reproducing aperture. The lateral side along which is moved the shutter unit is preferably a side parallel to the movement direction of the shutter unit.

In this disc cartridge, the recording and/or reproducing aperture is formed facing the lateral surface of the main cartridge body unit other than the arcuate section thereof and hence the shutter member for opening/closing the recording and/or reproducing aperture may be movably mounted in stability to the main cartridge body unit for positively closing the recording and/or reproducing aperture.

The disc cartridge of the present invention includes a disc, and a main cartridge body unit having the disc rotatably housed therein, in which one lateral surface of the main cartridge body unit is a substantially semicircular arcuate section having the center of the disc housed in the main cartridge body unit as center. An engagement recess engaged by a part of an ejection unit provided to the recording and/or reproducing apparatus loaded with the disc cartridge is formed in the lateral side of the main cartridge body unit carrying the arcuate section. A cut-out opened in an opposite direction to the inserting direction is formed on a side of the engagement recess opposite to the inserting direction into the recording and/or reproducing apparatus.

Another engagement recess is formed in a lateral side of the main cartridge body unit carrying the engagement recess.

A recording and/or reproducing aperture for exposing at least a portion of the disc is formed in the main cartridge body unit and the recording and/or reproducing aperture is formed for being opened in a lateral surface of the main cartridge body unit, formed with the engagement recess, other than the lateral side carrying the arcuate section of the main cartridge body unit. The shutter unit for opening/closing the recording and/or reproducing aperture is movably mounted to the main cartridge body unit.

When the disc cartridge of the present invention is loaded on the recording and/or reproducing apparatus, a part of the ejection unit is engaged in the engagement recess. In this case, a part of the ejection unit may be engaged in the cut-out provided in the side of the engagement recess opposite to the inserting direction into the recording and/or reproducing apparatus for being opened in an opposite direction to the inserting direction and hence may be engaged in the arcuately-shaped engagement recess. The part of the ejection unit may be positively engaged with the engagement recess even in case the disc cartridge is inserted at an inclination relative to the recording and/or reproducing apparatus.

Moreover, since a further engagement recess is provided in the disc cartridge, in addition to the engagement recess engaged by the part of the ejection unit, the loading operation may be achieved by engaging the loading unit in the other engagement recess as the orientation control means is engaged in the other engagement recess for orientation control.

Additional features and advantages of the present invention are described in, and will be apparent from, the following Detailed Description of the Invention and the figures.

DETAILED DESCRIPTION OF THE INVENTION

Figure 1:
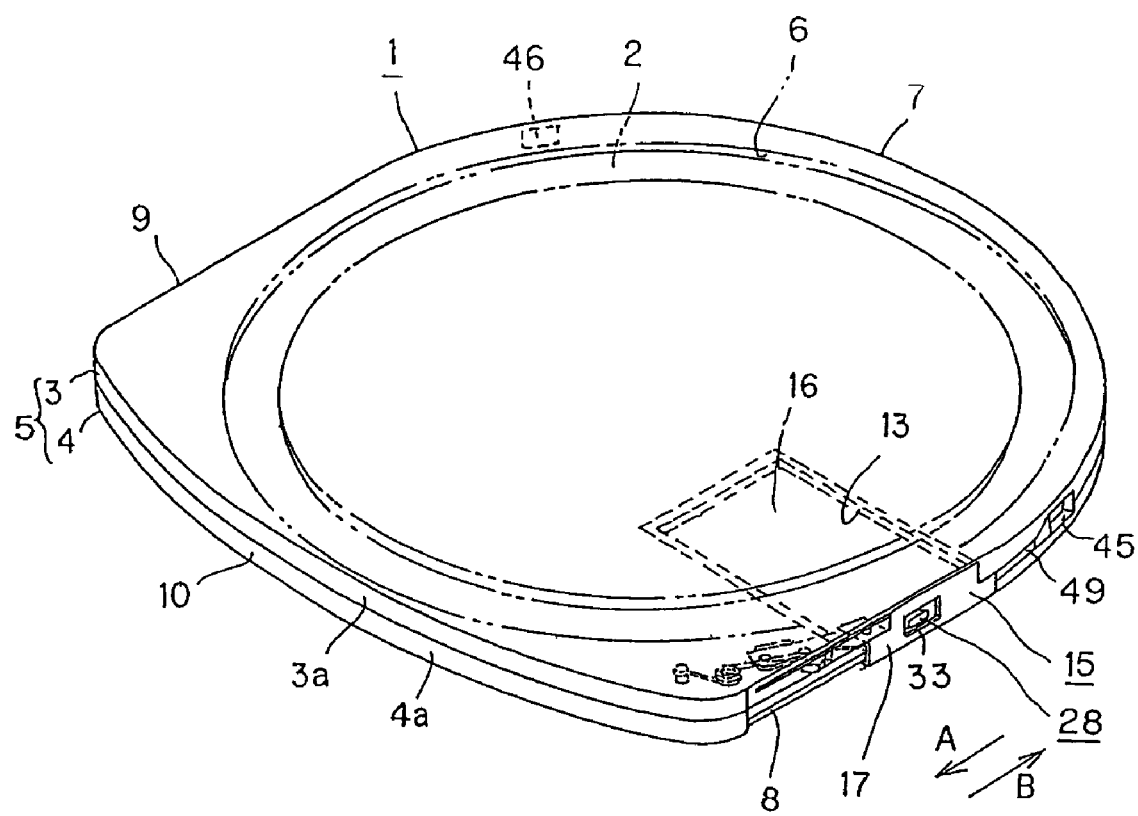
FIG. 1 is a perspective view showing a disc cartridge according to the present invention, looking from an upper cartridge half side.

The present invention relates to a disc cartridge, having a disc-shaped recording medium, such as an optical disc, held therein.

Referring now to the drawings, a disc cartridge according to the present invention is explained in detail.

Figure 2:
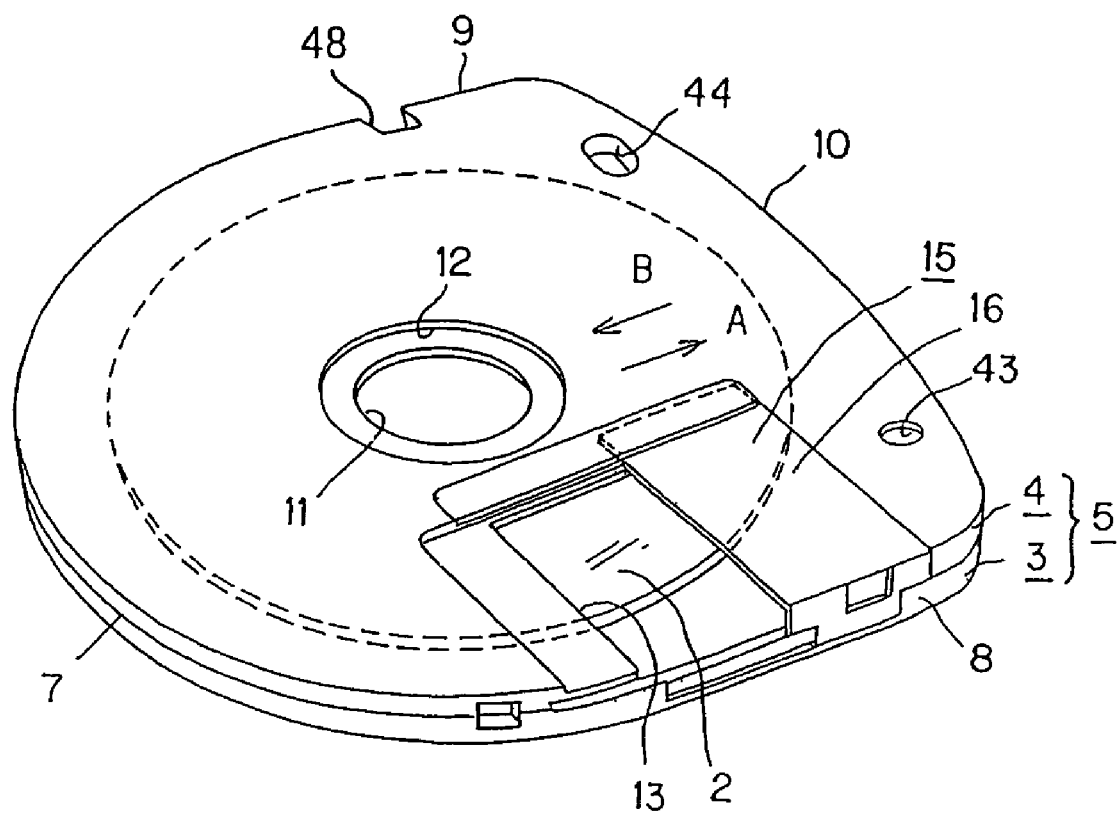
FIG. 2 is a perspective view showing a disc cartridge according to the present invention, looking from a lower cartridge half side.

A disc cartridge 1 according to the present invention houses therein an optical disc 2, as a disc-shaped recording medium, for rotation therein, and includes a main cartridge body unit 4, made up by upper and lower cartridge halves 3, 4, abutted and bonded together, as shown in FIGS. 1 and 2. The optical disc 2 is rotatably housed within this main cartridge body unit 4.

The disc cartridge 1 according to the present invention houses therein the optical disc 2, on which there are recorded program data or video data for executing e.g. a television game, and is of an extremely small size. The present disc cartridge 1 houses therein a small-sized optical disc 2 with a diameter on the order of, for example, 60 mm, and is of a size that can be held in a user's palm.

Meanwhile, the optical disc 2, housed in the present disc cartridge 1, is a replay-only disc, having information signals, such as program data, prerecorded thereon.

The upper and lower cartridge halves 3, 4, making up a main body unit 5, housing the disc cartridge 1, is molded from a synthetic resin material, and upstanding peripheral wall sections 3a, 4a are formed on the outer rim of the halves 3a, 4a, respectively. The upper and lower cartridge halves 3, 4 are bonded together, with the peripheral wall sections 3a, 4a abutting to each other, thereby forming a main cartridge body unit 5 delimiting a disc housing section 6 therein. The upper and lower cartridge halves 3, 4 are bonded to each other to form the main cartridge body unit 5, applying a welding technique, such as an ultrasonic welding technique, to welding projections formed upright on the sides of the upper and lower cartridge halves 3, 4 facing each other.

Figure 3:
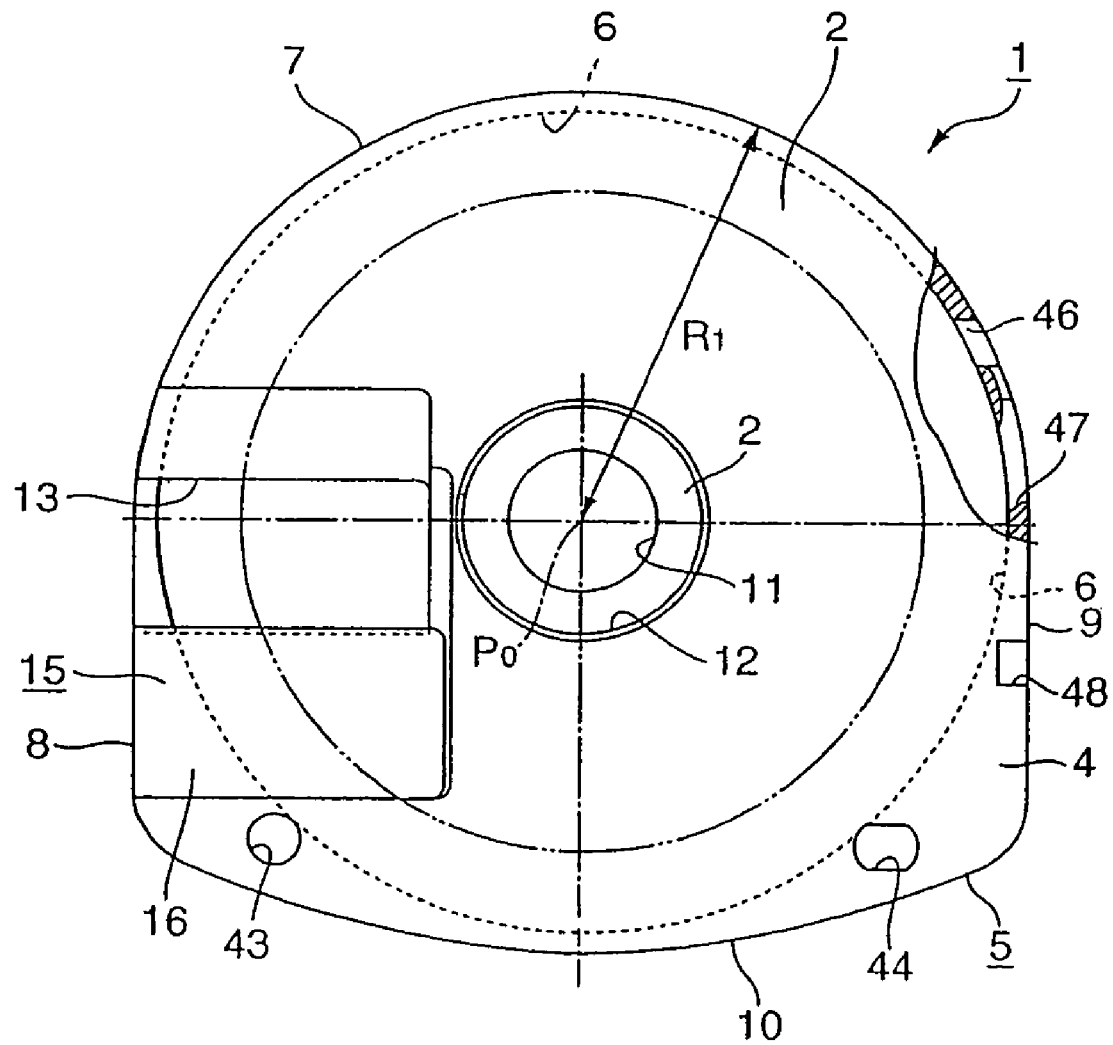
FIG. 3 is a plan view showing a disc cartridge according to the present invention, looking from a lower cartridge half side.

The main cartridge body unit 5, forming the disc cartridge 1 according to the present invention, has its front side, as an inserting side end of the disc cartridge 1 into the disc recording and/or reproducing apparatus, formed as an arcuate section 7, as shown in FIGS. 1 to 3. This arcuate section 7 is formed to a semicircle of the optical disc 2 of a radius R1 housed within the disc housing section 6 of the main cartridge body unit 5, with the center of the disc as a center P0 of the semicircle, as shown in FIG. 3. That is, the arcuate section 7 is formed as a semicircle commensurate with the semicircle of the optical disc 2 housed within the main cartridge body unit 5.

The facing lateral sides of the main cartridge body unit 5, consecutive to the arcuate section 7 of the main cartridge body unit 5, are formed as sides 8, 9 parallel to each other, while the back side of the main cartridge body unit 5, lying opposite to the arcuate section 7, is formed as a uniformly smoothly curved section 10. That is, the arcuate section 7 is formed as a semicircle substantially in register with the semicircle of the optical disc 2 housed in the main cartridge body unit 5.

With the disc cartridge 1 of the present invention, the front side thereof, as an inserting side surface, is a substantially semicircular arcuate section 7 of a curvature larger than the other side, opposite thereto, so that, when the disc cartridge is inserted in the slot-in style via cartridge insertion/ejection opening, the direction of insertion into the disc recording and/or reproducing apparatus can be identified extremely readily. In particular, with the disc cartridge 1, reduced in size so as to be held in the user's palm, the direction of insertion can be identified by the sensual touch feeling, thus prohibiting mistaken insertion to enable correct loading on the disc recording and/or reproducing apparatus. Moreover, with the present disc cartridge 1, insertion into a slot-in type disc recording and/or reproducing apparatus may be facilitated, while positive insertion may be assured.

Moreover, the disc cartridge 1 may be further reduced in size, as compared to the optical disc 2, accommodated therein, by having the inserting end side formed as a substantially semicircular arcuate section 7, and by having the back side opposite to the arcuate section 7 similarly formed as a curved section 10.

At a mid part of the lower cartridge half 4, forming the lower surface of the main cartridge body unit 5, there is formed a circular center opening 12 for exposing a center hole 11 of the optical disc 2 housed in the main cartridge body unit 5 and the ambient part thereof to outside, as shown in FIGS. 2 and 3. Into this center opening 12 is intruded a mating engagement portion, such as a turntable, of a disc rotating driving mechanism, provided to the disc recording and/or reproducing apparatus on which the disc cartridge 1 is loaded.

In the lower cartridge half 4, forming the lower surface of the main cartridge body unit 5, there is formed an aperture for the head part 13, operating as a recording/reproducing aperture. The aperture for the head part 13 is provided to the lateral side 8 of the main cartridge body unit 5, and is formed as a rectangular aperture sized so as to be large enough to permit a signal recording region of the optical disc 2 accommodated in the main cartridge body unit 5 to be exposed to outside across the inner and outer rims of the disc. That is, the aperture for the head part 13 is formed for being opened in the linear flat lateral side 8 different from the front side of the main cartridge body unit 5 carrying the arcuate section 7.

A shutter unit 15 for opening/closing the aperture for the head part 13 is movably mounted to the disc cartridge 1. The shutter unit 15 includes a flat-plate-shaped shutter member 16 of a rectangular shape large enough to close the aperture for the head part 13 and a retention part 17 of a U-shaped cross-section formed at the proximal side of the shutter member 16.

The shutter member 15 is formed by punching and warping a thin metal sheet or by shaping a synthetic resin material.

Figure 4:
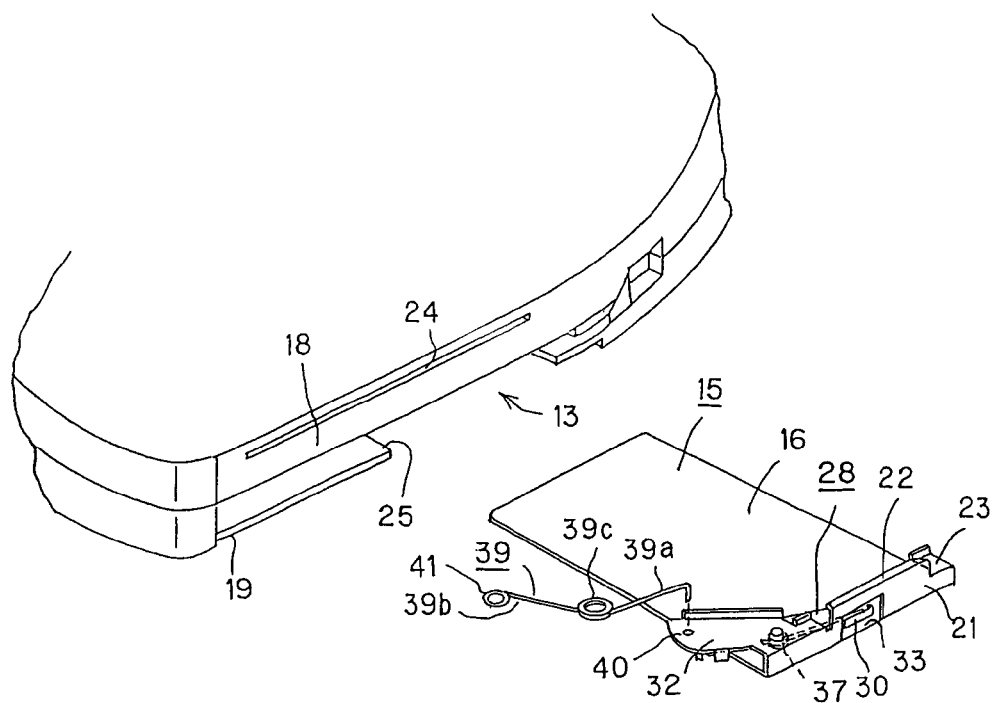
FIG. 4 is a perspective view showing a shutter unit and a main cartridge body unit carrying this shutter unit.

The shutter unit 15 is designed so that the upper cartridge half 3 of the cartridge body unit 5 is carried by the retention part 17 and is carried for movement in the directions indicated by arrows A and B for opening/closing the aperture for the head part 13. That is, the shutter unit 15 is mounted for movement on the main cartridge body unit 5 by a slide guide 18 being carried by the retention part 17, as shown in FIG. 4. The slide guide 18 is formed by a portion of an upstanding peripheral wall section 3a of the upper cartridge half 3.

Figure 5:
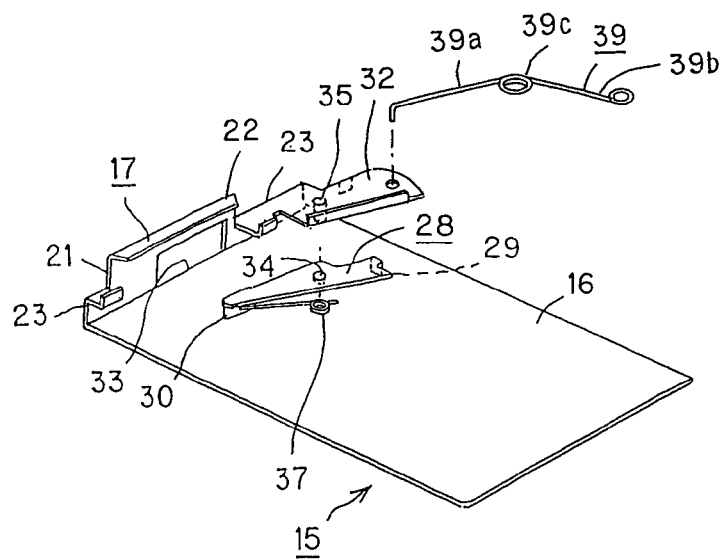
FIG. 5 is a perspective view showing the shutter unit and a shutter lock unit mounted on this shutter unit.

Referring to FIGS. 4 and 5, the retention part 17, provided to the shutter unit 15, is formed with a connecting piece 21 upstanding from the proximal end of the shutter unit 16, and a first engagement piece 22, bent towards the shutter unit 16, is provided to the distal end of the connecting piece 21. On both sides of the connecting piece 21, a second engagement piece 23, bent in an L-shape, is formed at a lower position than the first engagement piece 22. Meanwhile, the second engagement piece 23 is bent in an L-shape so that its distal end is protruded towards the first engagement piece 22.

Figure 6:
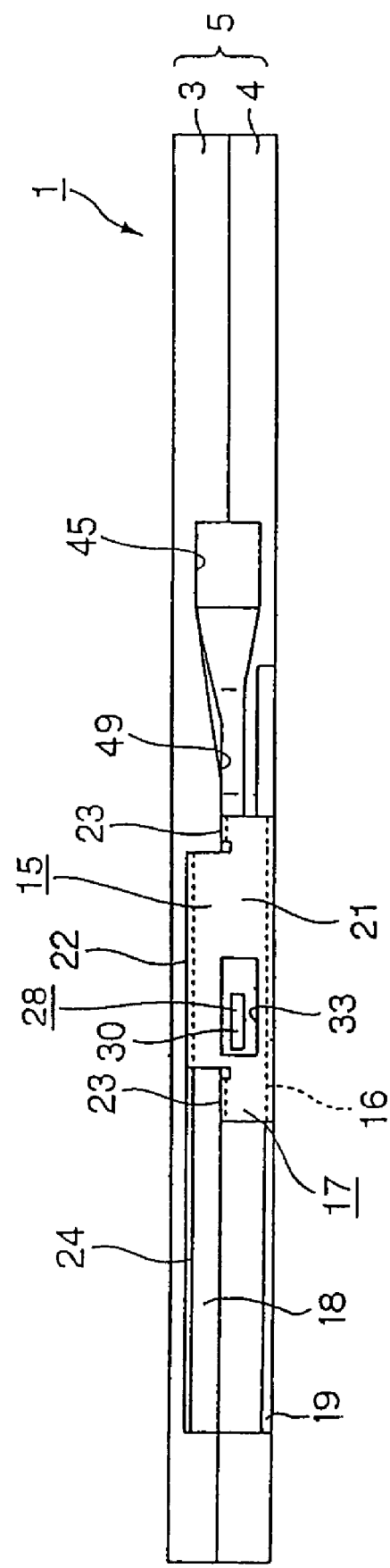
FIG. 6 is a side view showing the lateral side of the disc cartridge, carrying the shutter unit, according to the present invention.
Figure 7:
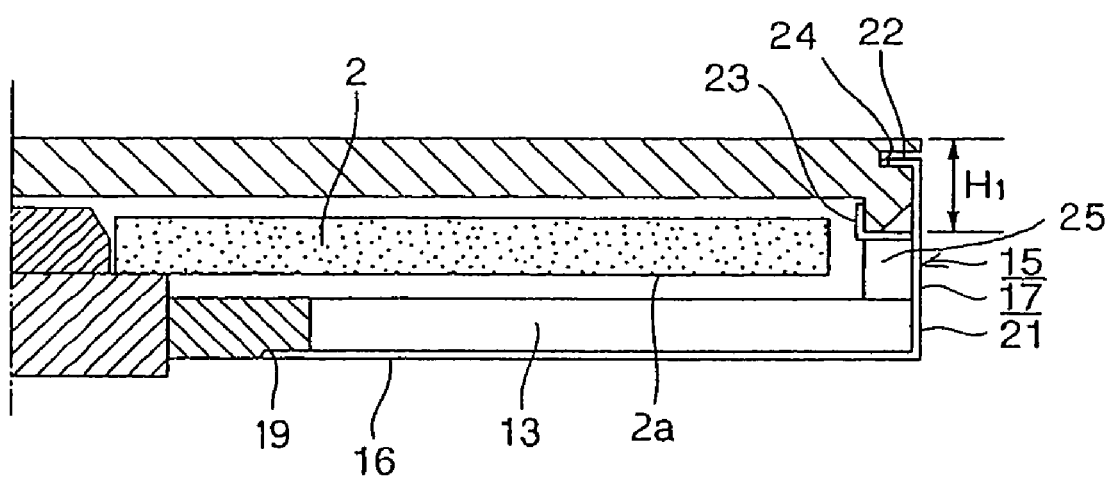
FIG. 7 is a cross-sectional view showing the shutter unit mounted to the main cartridge body unit.

The shutter unit 15 is arranged on the main cartridge body unit 5 so that the shutter member 16 is extended over the aperture for the head part 13, as shown in FIG. 2. At this time, the shutter unit 15 holds the retention part 17 in a clinching fashion by the first and second engagement pieces 22, 23, by the first engagement piece 22 of the retention part 17 engaging in an engagement groove 24 formed in the lateral side of the slide guide 18 and by the L-shaped second engagement piece 23 engaging with the distal end of the slide guide 18, as shown in FIGS. 6 and 7. The shutter unit 15, carried in this manner, is moved in the directions indicated by arrows A and B for opening/closing the aperture for the head part 13, by being guided by the retention part 17.

The area of the lower cartridge half 4, traversed by the shutter member 16, is formed with a recessed shutter slide part 19. This shutter slide part 19 is formed to a depth such that the shutter member 16 is not protruded from the surface of the main cartridge body unit 5.

In the disc cartridge 1 of the present invention, a cut-out 25 is formed in a region of the upstanding peripheral wall section 4a of the lower cartridge half 4 facing the aperture for the head part 13, as shown in FIGS. 4 and 7. That is, the aperture for the head part 13 serves for exposing an area of the main cartridge body unit 5 extending from the inner rim up to the outer rim of the main cartridge body unit 5.

At least the part of the slide guide 18 of the upper cartridge half 3 facing the aperture for the head part 13 is of a height $H_1$ not protruding from the lower surface 2a of the optical disc 2, facing the lower cartridge half 4, when the optical disc 2 loaded in the disc cartridge 1 in position as to the height on the cartridge loading section in the disc recording and/or reproducing apparatus is loaded on the turntable, as shown in FIG. 7.

With the above-described disc cartridge 1, when the shutter unit 15 is moved to open the aperture for the head part 13, the optical pickup, as a head part for reading out the information signals recorded on the optical disc 2, may be located in its entirety within the main cartridge body unit 5. In addition, when the optical pickup has been moved to a position scanning the outer rim of the optical disc 2, the optical blocks other than an objective lens, converging the light beam, used for scanning the signal recording area of the optical disc 2, may be located outside the main cartridge body unit 5, as the objective lens is located within the main cartridge body unit 5, as will be explained subsequently.

Hence, with the disc cartridge 1 of the present invention, the optical pickup may be located across the inner part and an outer part of the main cartridge body unit 5, as the optical pickup is proximate to the optical disc 2. Thus, the signal recording area may be formed up to the outer rim of the optical disc 2, thereby increasing the recording capacity of the optical disc 2. Moreover, since the optical pickup may be proximate to the optical disc 2, the numerical aperture NA of the objective lens may be larger, while the spot of the light beam condensed on the optical disc 2 may be smaller, thereby increasing the recording density of the information signals recorded on the optical disc 2. Since the recording density may be improved with increase in the recording capacity, the optical disc in need of a preset recording capacity may be reduced in diameter. Since the optical disc 2 may be scanned as the optical pickup is positioned for movement across the inner and outer parts of the main cartridge body unit 5, the main cartridge body unit 5 may be reduced in size, whilst the disc recording and/or reproducing apparatus, employing the disc cartridge 1, may also be reduced in size.

In the disc cartridge 1, according to the present invention, the shutter unit 15, opening/closing the aperture for the head part 13, is mounted for movement along the flat lateral surface 8 of the main cartridge body unit 5, as shown in FIGS. 1 and 2. Thus, the shutter unit 15 is moved linearly with the retention part contacting with the planar lateral surface 8, and hence may be moved in stability.

With the disc cartridge 1 according to the present invention, the shutter unit 15, adapted for opening/closing the aperture for the head part 13, is mounted for movement with the retention part contacting with the planar lateral surface 8, as shown in FIGS. 1 and 2. Since the retention part 17 is moved linearly along the flat lateral side 18, the shutter unit 15 may be moved in stability.

Since the aperture for the head part 13 is formed at a location facing the flat lateral side 8 of the main cartridge body unit 5, part of the lower cartridge half 4 carrying the cut-out 25 is also formed as a linear surface. Thus, with the aperture for the head part 13, formed with the cut-out 25 and opened on the side of the lateral surface 8 of the main cartridge body unit 5 facing to outside, it is possible to close the rectangular-shaped shutter member 15, carrying a linear U-shaped retention part 17, more reliably.

The disc cartridge 1 according to the present invention is provided with a lock unit 27 for prohibiting the movement of the shutter unit 15 when the shutter unit 15 has been moved to a position closing the aperture for the head part 13. The lock unit 27 of the shutter unit 15 includes a lock lever 28, mounted for rotation to the shutter unit 15, and an engagement part 29 on the main cartridge body unit 5, engaged by this lock lever 28, as shown in FIGS. 5 and 8.

Figure 8:
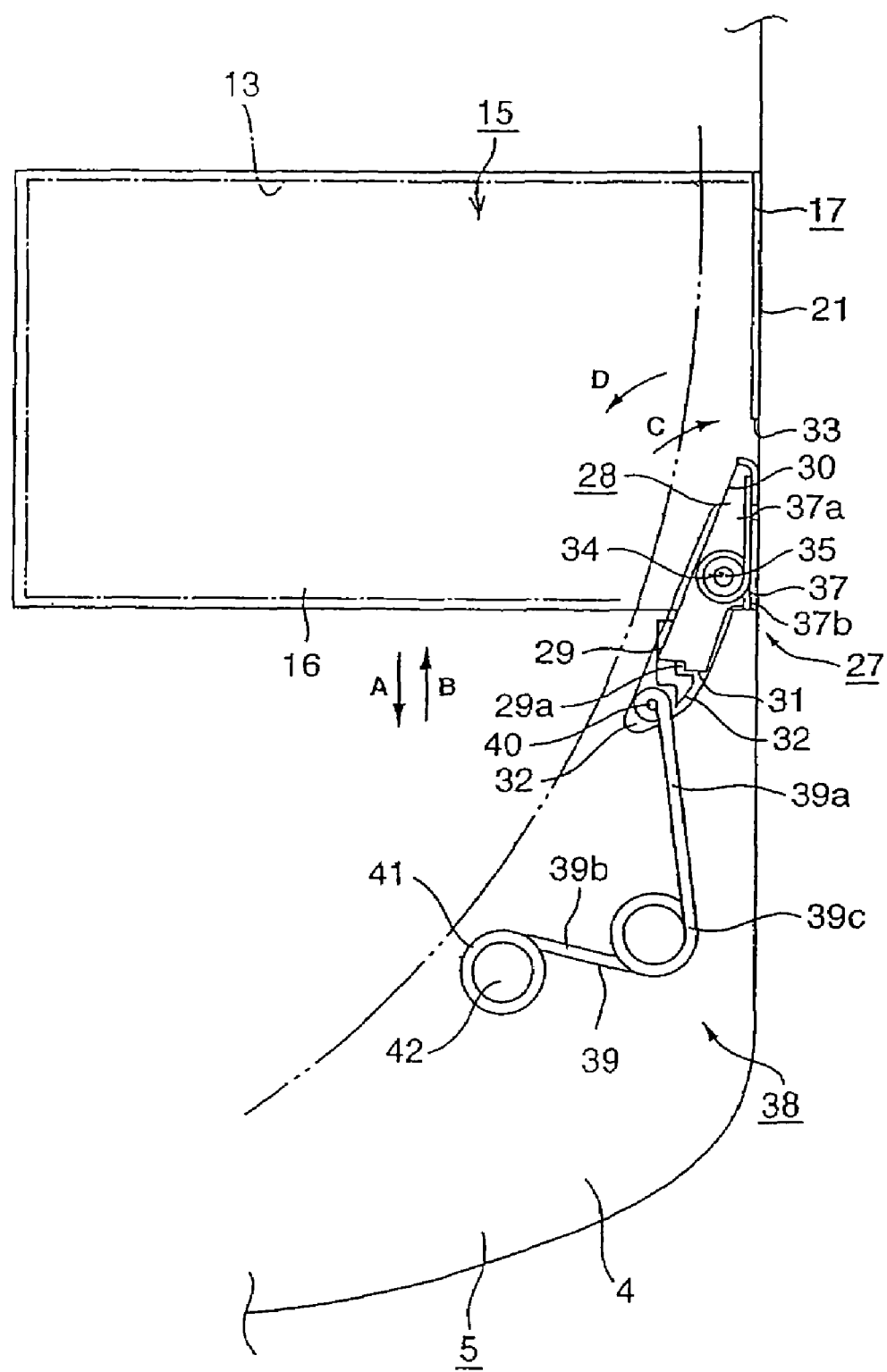
FIG. 8 is a plan view showing the shutter unit locked by the shutter lock unit.

The lock lever 28, forming a lock member of the lock unit 27, is formed as an elongated plate-shaped member, including an upstanding thrust part 30, extending along a lateral side edge thereof, and an upstanding engagement piece 31 on the opposite side for engagement by the engagement part 29, as shown in FIGS. 5 and 8. The lock lever 28 is rotationally mounted on a lock lever mounting piece 32 provided to the shutter unit 15. The lock lever mounting piece 32 is formed for protruding laterally of the shutter member 16 from the upper edge of the connecting piece 21 forming the slide guide 18.

The lock lever 28 is rotatably mounted about a pivot 35 as the center of rotation, so that the thrust part 30 at one end thereof faces a rectangular window 33 formed at a mid portion of the connecting piece 21, as shown in FIGS. 1, 6 and 8. At this time, the engagement piece 31, provided to the opposite side of the lock lever 28, is protruded laterally of the shutter member 16 for extending along the lock lever mounting piece 32.

A window 33 formed in the connecting piece 21 of the shutter unit 15 is engaged by a shutter unit movement inhibiting spring, provided for inhibiting movement of the shutter unit 15 to the disc recording and/or reproducing apparatus, to which the disc cartridge 1 is mounted.

The lock lever 28, carried by the shutter unit 15, is rotationally biased by a rotational force energizing spring 37, coiled about the pivot 35, in a direction shown by an arrow C in FIG. 8 for protruding the thrust part 30 from the window 33. The rotational force energizing spring 37 is formed by a torsion coil spring, and has one arm section 37*a* retained by the thrust part 30, while having the other arm section 37*b* retained by the inner surface of the connecting piece 21 of the shutter unit 15, for rotationally biasing the lock lever 28 in the direction indicated by arrow C in FIG. 8.

The rotational position of the lock lever 28 by the rotational force energizing spring 37 is determined by abutment of the side of the lock lever 28 carrying the thrust part 30 against the connecting piece 21.

The shutter unit 15, carrying the lock lever 28 as described above, is mounted for movement to the main cartridge body unit 5, by having the retention part 17 carried by the upper cartridge half 3, as described above.

When the shutter unit 15 is at a position of closing the aperture for the head part 13, as shown in FIGS. 6 and 8, the lock lever 28 is rotated in the direction of arrow C in FIG. 8, under the biasing force of the rotational force energizing spring 37, for intruding the thrust part 30 into the window 33 formed in the connecting piece 21. At this time, the lock lever 28 inhibits movement of the shutter unit 15, by the engagement piece 31 thereof engaging with a mating engaging part 29, provided to the main cartridge body unit 5, while retaining the aperture for the head part 13 in a state of closure by the shutter unit 16.

The mating engaging part 29 of the main cartridge body unit 5 is provided to an area of the inner surface of the lower cartridge half 4, outside the area of the disc housing section 6, which may be engaged by the engagement piece 31 of the lock lever 28 when the shutter unit 15 is in the closure position. The mating engaging part 29 is formed as one with the lower cartridge half 4. The mating engaging part 29 is formed with an engagement recess 29*a* opened on one side. In this engagement recess 29*a* is intruded the engagement piece 31 provided to the lock lever 28.

Figure 9:
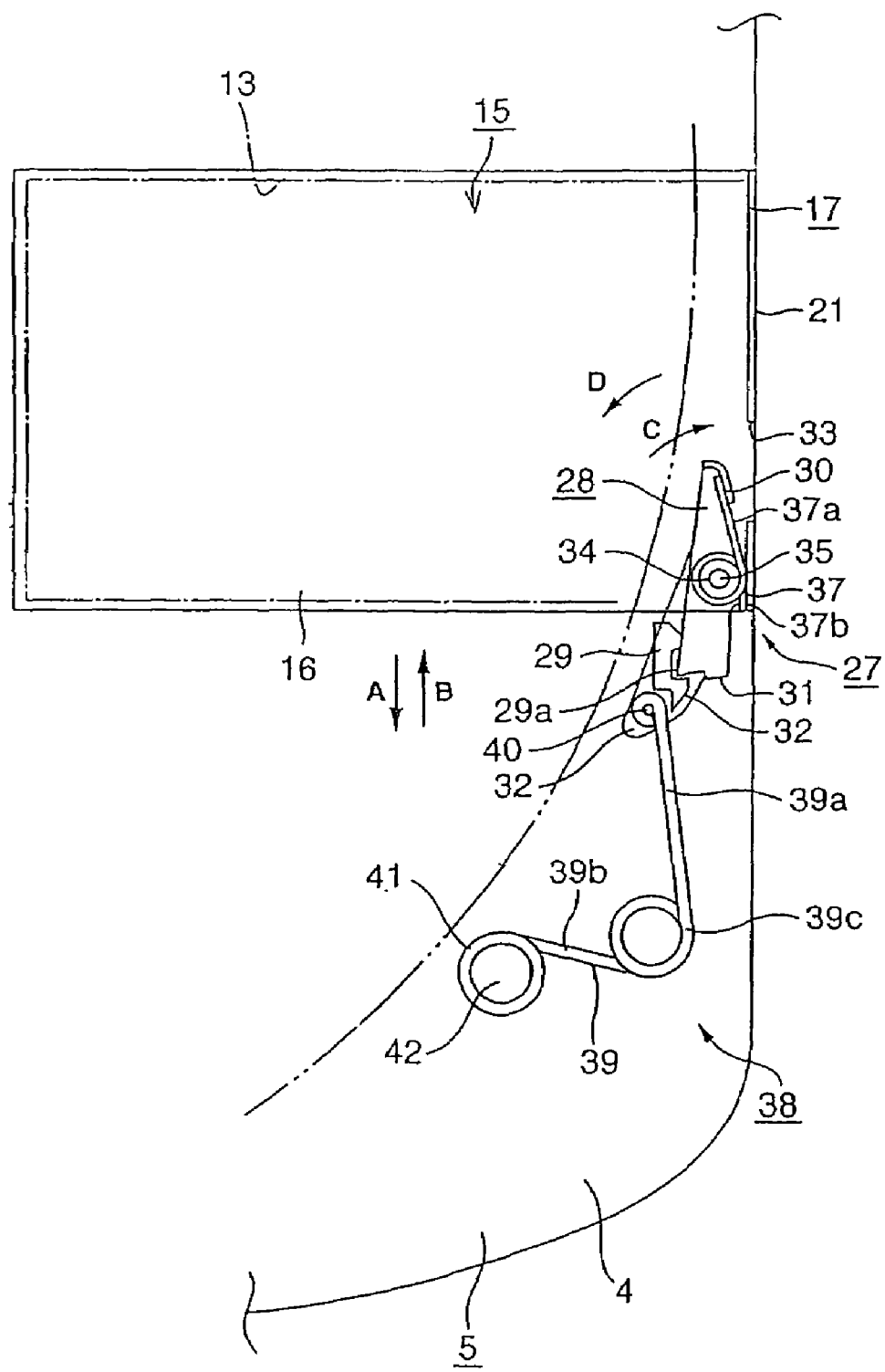
FIG. 9 is a plan view showing the shutter unit in the unlocked state.

When the disc cartridge 1 is introduced into the disc recording and/or reproducing apparatus, the lock lever 28, which has locked the shutter unit 15 in the closure position, is rotated in the direction indicated by arrow D in FIG. 8, against the bias of the rotational force energizing spring 37, by the thrust part 30 being thrust by the shutter unit movement inhibiting spring intruded into engagement with the window 33 formed in the connecting piece 21. When the lock lever 28 is rotated in the direction of the arrow D in FIG. 8, the engagement piece 31 is disengaged from the engagement recess 29*a* of the mating engaging part 29, as shown in FIG. 9, for detaching the engagement piece 31 from the engagement recess 29*a* of the mating engaging part 29, thereby unlocking the shutter unit 15. The shutter unit 15 may now be movable along the direction of the arrow A in FIG. 2, that is, in a direction of opening the aperture for the head part 13.

Meanwhile, the opening/closure of the aperture for the head part 13 is by relative movement between the main cartridge body unit 5 and the shutter unit 15. The opening/closure of the aperture for the head part 13 will be explained in detail subsequently.

With the above-described lock unit 27 for the shutter unit 15, in which the lock lever 28, locking the shutter unit 15 in the closure position, is mounted to the shutter unit 15, movable with respect to the main cartridge body unit 5, the lock lever may be moved in unison with the shutter unit 15 to follow up with the opening/closure of the aperture for the head part 13. As a result, the lock lever 28 may be placed such that, when the shutter unit 15 is in the position of closing the aperture for the head part 13, at least the thrust part 30 overlies the aperture for the head part 13, thus enabling the size of the disc cartridge 1 to be reduced. That is, it should be necessary to provide the space, in which to arrange the lock lever 28 in its entirety, to the main cartridge body unit 5, in case the lock lever 28 is provided to the main cartridge body unit 5. This necessity may be eliminated with the disc cartridge 1 of the present invention, such that it is only sufficient to provide solely the mating engaging part 29, engaged by a portion of the lock lever 28, with the consequence that the main cartridge body unit 5 may further be reduced in size.

The disc cartridge 1, according to the present invention, may further be provided with a shutter opening/closure unit 38 which implements reliable movement of the shutter unit 15 opening/closing the aperture for the head part 13 and which reliably holds the shutter unit 15 in the position of opening or closing the aperture for the head part 13.

This shutter opening/closure unit 38 is formed using a bi-directional energizing unit for selectively energizing the shutter unit 15 into movement in two directions, viz. in a direction of opening the aperture for the head part 13 and in a direction of closing the aperture for the head part. Specifically, the bi-directional energizing unit is formed by a torsion coil spring 39, as shown in FIG. 8. This torsion coil spring 39, mounted between the shutter unit 15 and the main cartridge body unit 5, is arranged at a location towards which the shutter unit 15 is moved in the direction of opening the aperture for the head part 13, as shown in FIG. 8. Specifically, the torsion coil spring 39 is mounted by having the distal end of an arm section 39a engaged in an engagement opening 40 formed in the distal end of the lock lever mounting piece 32 and by having a ring 41 at the distal end of the other arm section 39b engaged by a support pin 42 protuberantly formed on the inner surface of the main cartridge body unit 5.

Figure 10:
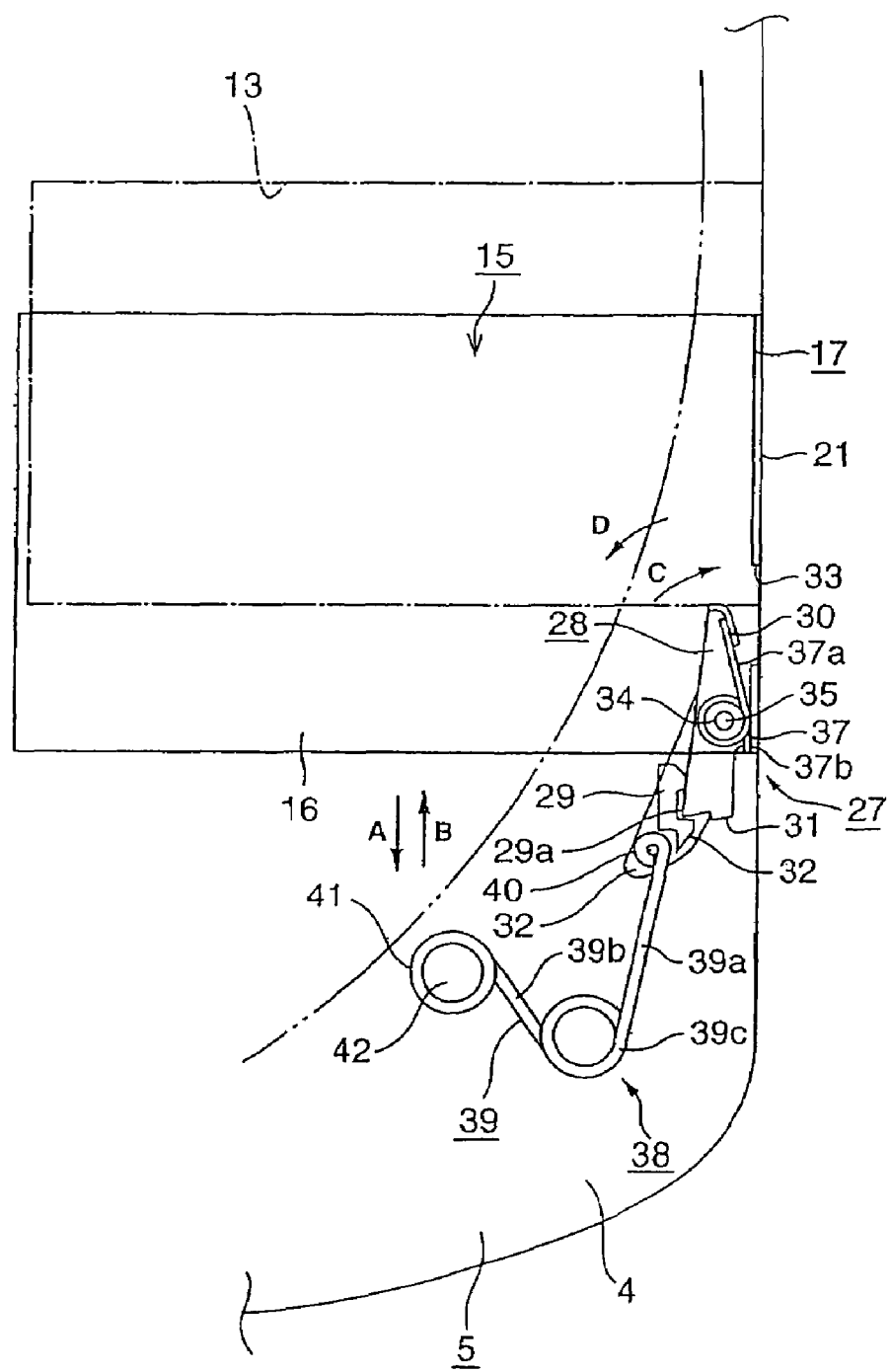
FIG. 10 is a plan view showing the state in which the shutter unit is being moved in a direction of opening an aperture for a head unit.
Figure 11:
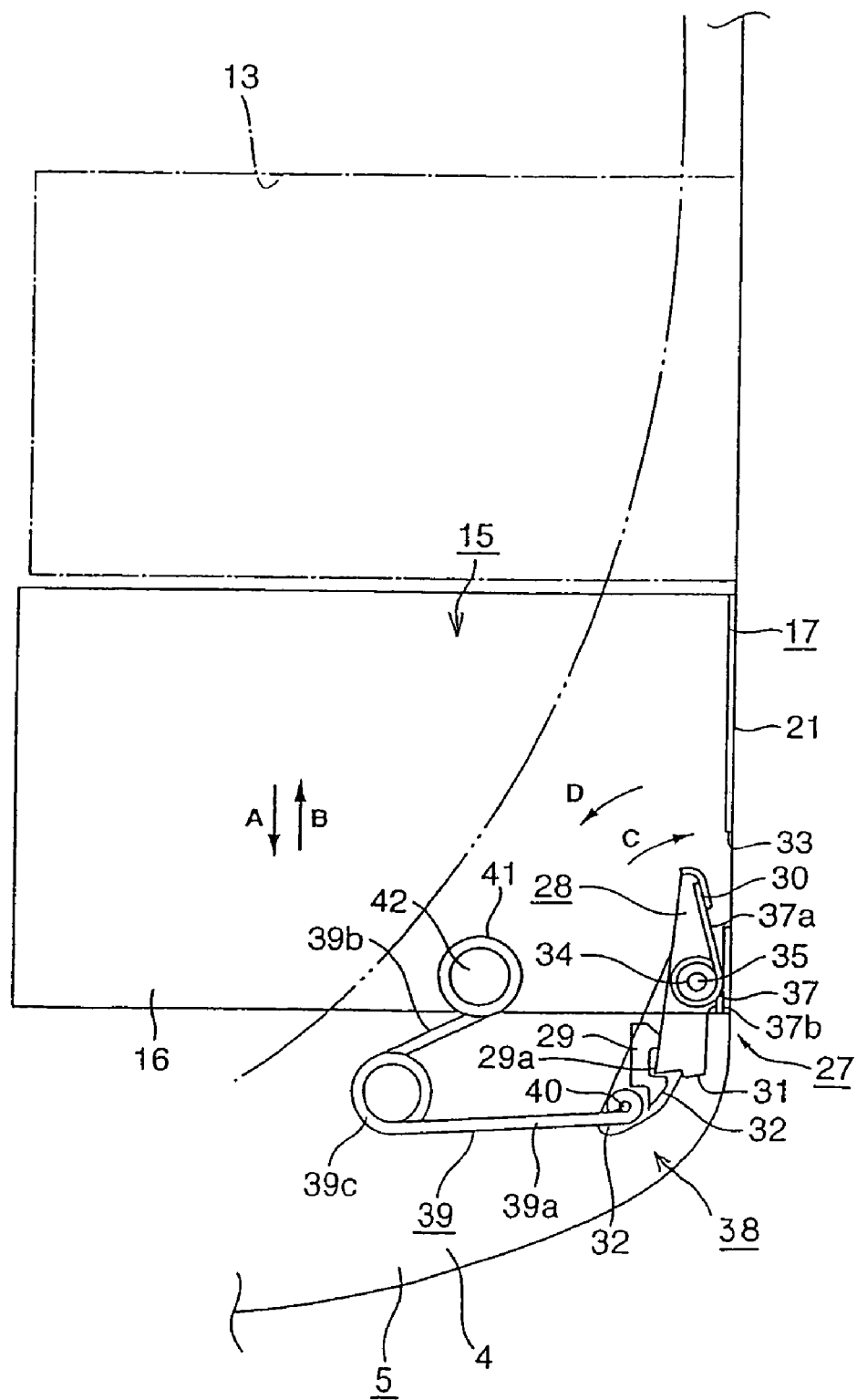
FIG. 11 is a plan view showing the state in which the shutter unit has been moved in a direction of opening the aperture for the head unit.
Figure 12:
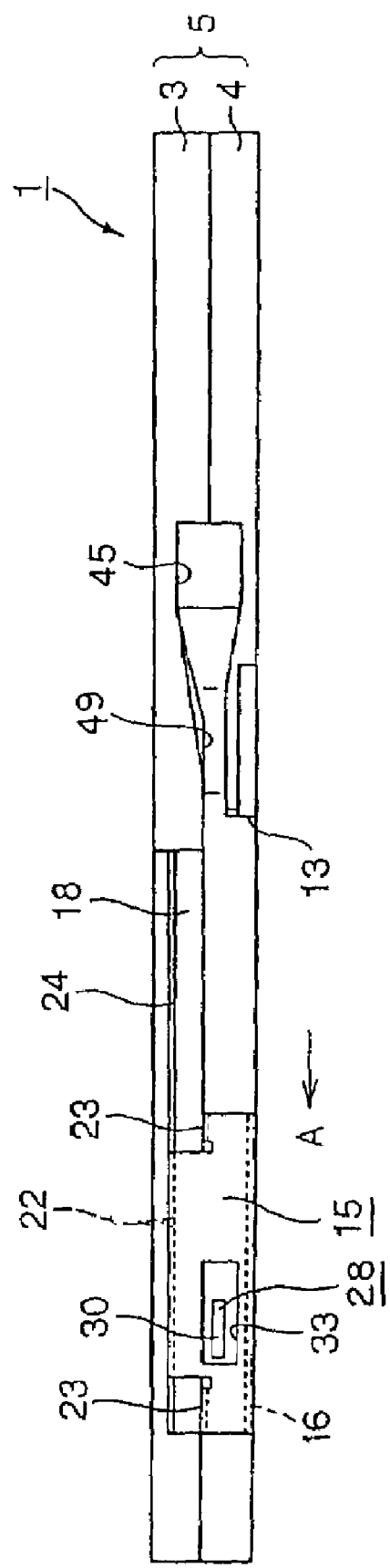
FIG. 12 is a side view of the disc cartridge showing the opened state of the aperture for the head unit.

When the torsion coil spring 39 is at the position of closing the aperture for the head part 13, the torsion coil spring 39 biases the shutter unit 15 in the direction indicated by the arrow B in FIG. 8 for retaining the state of closing the aperture for the head part 13. When the disc cartridge 1 is loaded on the disc recording and/or reproducing apparatus, and the shutter unit 15, released from the locked state by the lock unit 27 for the shutter unit, is moved relative to the main cartridge body unit 5 in the direction of the arrow A in FIG. 8 for opening the aperture for the head part 13, a coil part 39c, formed centrally of the spring in an unfixed state, is moved in the direction of arrow A, along which is moved the shutter unit 15. When the coil part 39c is further moved along the direction of the arrow A and is moved beyond the location of a support pin 42 along the direction of movement of the shutter unit 15, as shown in FIG. 10, the biasing direction is reversed. On reversal of the biasing direction, the torsion coil spring 39 biases the shutter unit 15 into movement along the arrow A in FIG. 10. Thus, the shutter unit 15 is moved in a direction of opening the aperture for the head part 13, to retain the aperture for the head part 13 in the opened position, as shown in FIGS. 11 and 12

When the disc cartridge 1, in a state in which the shutter unit 15 retains the aperture for the head part 13 in the opened position, is taken out from the disc recording and/or reproducing apparatus, by way of performing the operation for ejection, the shutter unit 15 is moved along the direction of arrow B in FIG. 10, relative to the main cartridge body unit 5, with the center coil part 39c being similarly moved along the direction of arrow B. When the shutter unit 15 is further moved along the direction of arrow B, such that it surpasses the location of the support pin 42 along the direction of movement of the shutter unit 15, the biasing direction is reversed. On reversion of the biasing direction, the torsion coil spring 39 biases the shutter unit 15 into movement along the arrow B in FIG. 9, such that the shutter unit 15 is moved in the direction of closing the aperture for the head part 13, thereby retaining the aperture for the head part in the closed state.

The shutter unit 15, biased by the torsion coil spring 39, forming the bi-directional energizing unit, is carried in the position of closing the aperture for the head part 13 and in the position of opening the aperture for the head part 13, under the biasing force of the torsion coil spring 39, and hence may be maintained reliably in the position of closing or opening the aperture for the head part 13.

In the disc cartridge 1, according to the present invention, provided not only with the lock unit 27 for the shutter unit, locking the shutter unit 15 in the closed position, but also with the shutter opening/closure unit 38, having the bi-directional energizing unit for selectively biasing the shutter unit 15 in the two directions, the shutter unit 15 may be reliably retained in the position of closing the aperture for the head part 13, while the reliable opening/closure operation for the aperture for the head part 13 may be achieved.

For reliably closing the aperture for the head part 13, it is only sufficient to provide the lock unit 27 for the shutter unit. For implementing a stable opening/closure movement of the shutter unit 15, maintaining the closed state of the aperture for the head part 13, and for reliably maintaining the opened state of the aperture for the head part 13, it is possible to provide only the shutter opening/closure unit 38 having the bi-directional energizing unit.

In the disc cartridge 1, according to the present invention, the lateral surface 8 of the main cartridge body unit 5, carrying the shutter unit 15, is formed with a guide groove 49, into which is intruded a shutter unit releasing piece, provided to the disc recording and/or reproducing apparatus, as shown in FIGS. 1, 6 and 12.

In the lower surface of the main cartridge body unit 5, on both sides of the back surface, forming the curved section 10, there are formed first and second positioning holes 43, 44, engaged by positioning pins, provided to the disc recording and/or reproducing apparatus, as shown in FIGS. 2 and 3. Meanwhile, the second positioning hole 44 is formed as an elongated hole, having the width-wise direction, lying at right angles to the direction of movement of the shutter unit 15, as a long radius.

On both sides of the arcuate section 7 of the disc cartridge 1, operating as an inserting end of the disc cartridge 1 into the recording and/or reproducing apparatus, there are provided first and second engagement recesses 45, 46 engaged by a portion of a cartridge loading unit provided to the recording and/or reproducing apparatus or a portion of a loading controlling member provided to the recording and/or reproducing apparatus, as shown in FIGS. 1 and 2.

In a location proximate to the opposite lateral side 9 of the arcuate section 7, there is provided a third engagement recess 47 engaged by a portion of an ejection unit provided to the recording and/or reproducing apparatus, as shown in FIG. 3. Moreover, in a flat lateral side 9 of the main cartridge body unit 5, formed with the engagement recess 47 for ejection of the main cartridge body unit 5, there is formed a fourth engagement recess 48.

The third engagement recess 47 is formed so that one lateral side thereof is proximate to a center P3 along the longitudinal direction of an area of the lateral side of the arcuate section 7 of the main cartridge body unit 5, as shown in FIG. 4. The longitudinal direction is coincident with the inserting direction of the main cartridge body unit 5 into the recording and/or reproducing apparatus. That is, the third engagement recess 47 is formed towards the inserting direction from a center P3 into the recording and/or reproducing apparatus.

Figure 13:
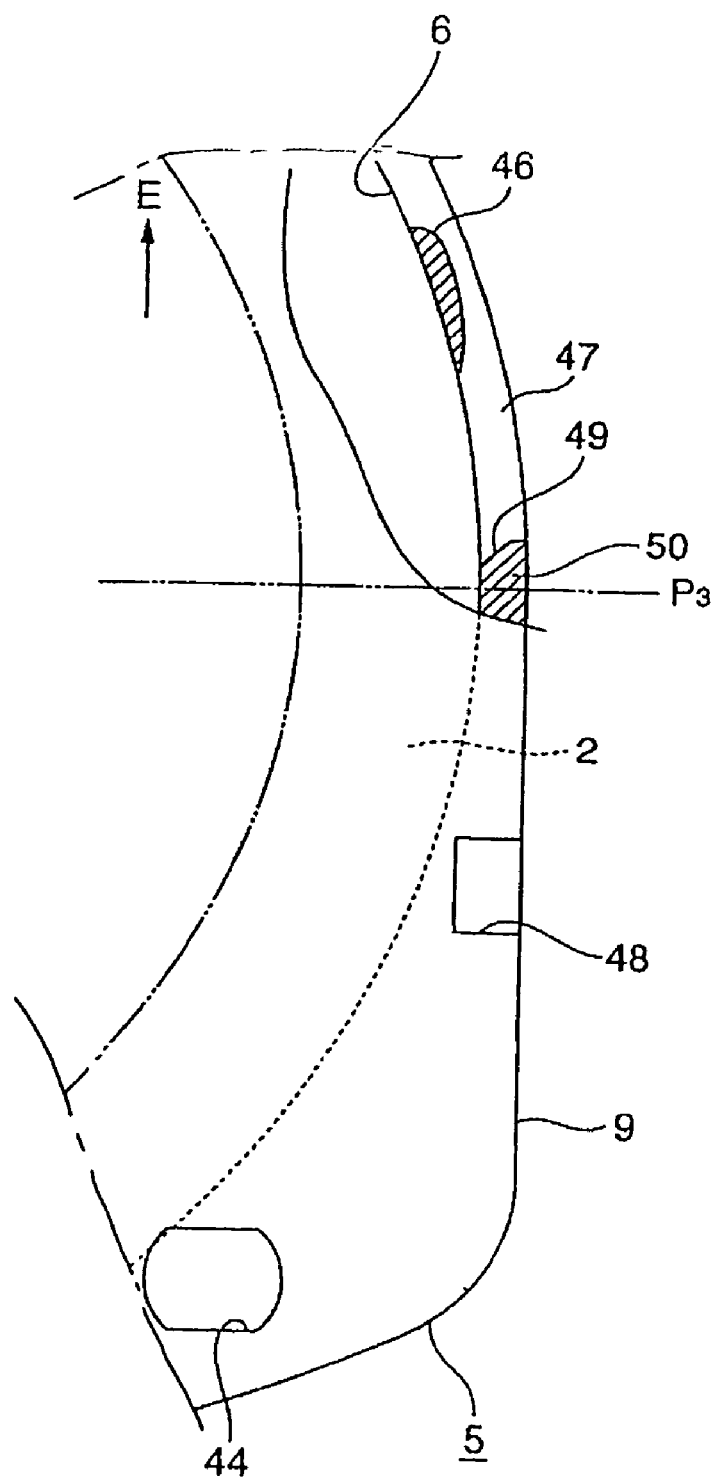
FIG. 13 is a plan view showing third and fourth engagement recesses provided in the main cartridge body unit.

In the surface of the third engagement recess 47 opposite to the inserting direction E into the recording and/or reproducing apparatus, there is formed a cut-out 49 formed in a direction opposite to the inserting direction, as shown in FIG. 13. This cut-out is formed to delimit a lug 49a at a location of the third engagement recess 47 opposite to the direction of insertion E into the recording and/or reproducing apparatus for protruding in the inserting direction.

The fourth engagement recess 48 is formed as a rectangular-shaped recess opened in the lateral surface 9 of the main cartridge body unit 5.

With the disc cartridge 1 of the present invention, in which there is provided the cut-out 49a in the surface of the third engagement recess 47 inclined in the opposite direction to the inserting direction into the recording and/or reproducing apparatus, the ejection lever may reliably be engaged with the disc cartridge 1 by having the distal end of the ejection lever, as a part of the ejection unit provided to the recording and/or reproducing apparatus, engaged with the surface formed with the cut-out 49. For example, even if the disc cartridge 1 is inserted with a tilt into the recording and/or reproducing apparatus, and the ejection lever is intruded obliquely into the engagement recess 47, the inclined cut-out 49a is able to take up the tilt to achieve reliable engagement. Since the present disc cartridge 1 may reliably be engaged with the ejection unit, the bias force for ejecting the disc cartridge 1 may be stored in the ejection unit as a result of the insertion into the recording and/or reproducing apparatus. The result is that, by employing the disc cartridge 1 according to the present invention, a recording and/or reproducing apparatus, enabling reliable ejection, may be achieved.

In particular, with the present disc cartridge 1 of the present invention, in which the engagement recess 47 is provided in the arcuate section 7 and yet the reliable engagement with the ejection unit of the recording and/or reproducing apparatus may be achieved, the recording and/or reproducing apparatus may be reduced in size without constraint as to the mounting position of the ejection unit.

Moreover, with the present disc cartridge 1 of the present invention, in which the fourth engagement recess 48 as a further engagement recess is provided in addition to the third engagement recess 47 engaged by a part of the ejection unit, the loading operation to the recording and/or reproducing apparatus may be achieved by exploiting only the lateral surface 9, by engaging the loading unit with the fourth engagement recess 48, as a part of the orientation control unit for controlling the inserting direction of the disc cartridge 1 is engaged e.g. with the third engagement recess 47 to control the orientation of insertion into the recording and/or reproducing apparatus. Since the lateral side 8 of the disc cartridge 1, carrying the shutter unit 15, is carried by a shutter releasing means, adapted for releasing the shutter unit 15, the loading operation becomes possible by exploiting only one lateral side 9 of the disc cartridge 1.

Since the loading unit may be provided only on one side of the disc cartridge 1, according to the present invention, the recording and/or reproducing apparatus provided with the loading unit may readily be reduced in size.

In the lateral sides 8, 9 or the bottom surface of the cartridge main body unit 5, a discriminating opening or a discriminating recess for identifying the sort of the optical disc 2 is provided as necessary.

Figure 14:
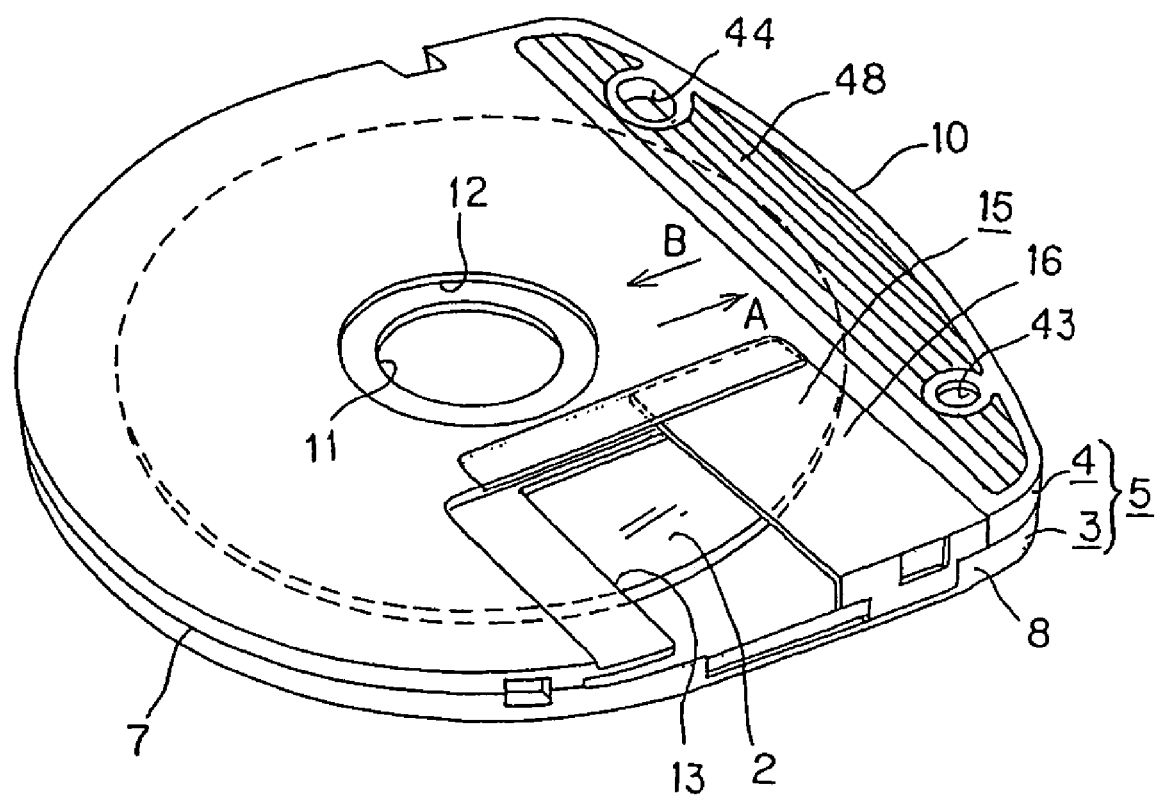
FIG. 14 is a perspective view showing another example of a disc cartridge of the present invention, looking from the lower cartridge half side.

The disc cartridge 1, according to the present invention, is inserted into the recording and/or reproducing apparatus, with the semi-circular arcuate section 7 as an inserting end, so that it is loaded on or unloaded from the apparatus as the user grips the back side curved section 10, opposite to the arcuate section 7. In addition to the inserting end of the disc cartridge 1 being formed as the semicircular arcuate section 7, the disc cartridge 1 is formed to an extremely small size. Thus, a roughed surface for anti-slip 48 may be provided on the back surface of the lower cartridge half 4, for assuring reliable gripping by hand or finger during loading/unloading on or from the recording and/or reproducing apparatus, as shown in FIG. 14. This roughed surface 48 is provided on the back surface formed as the curved section 10 of the lower cartridge half 4.

The roughed surface 48 may also be provided to the upper cartridge half 3. In this case, the roughed surface 48 is provided facing the roughed surface 48 of the lower cartridge half 4.

An embodiment of the disc recording and/or reproducing apparatus, employing the disc cartridge 1, according to the present invention, is hereinafter explained.

In the disc cartridge 1, according to the present invention, there is housed the optical disc 2, having recorded thereon the program data or video data needed for executing e.g. a TV game. The disc recording and/or reproducing apparatus, employing the disc cartridge 1 of the present invention, housing this sort of the optical disc 2, is made up by a main body unit of the apparatus 51, carrying the disc cartridge 1, and having enclosed therein a disc driving unit for reproducing at least data recorded on the optical disc, and by a display 52 for demonstrating image data or text data reproduced from the optical disc 2, as shown in FIG. 15.

Figure 15:
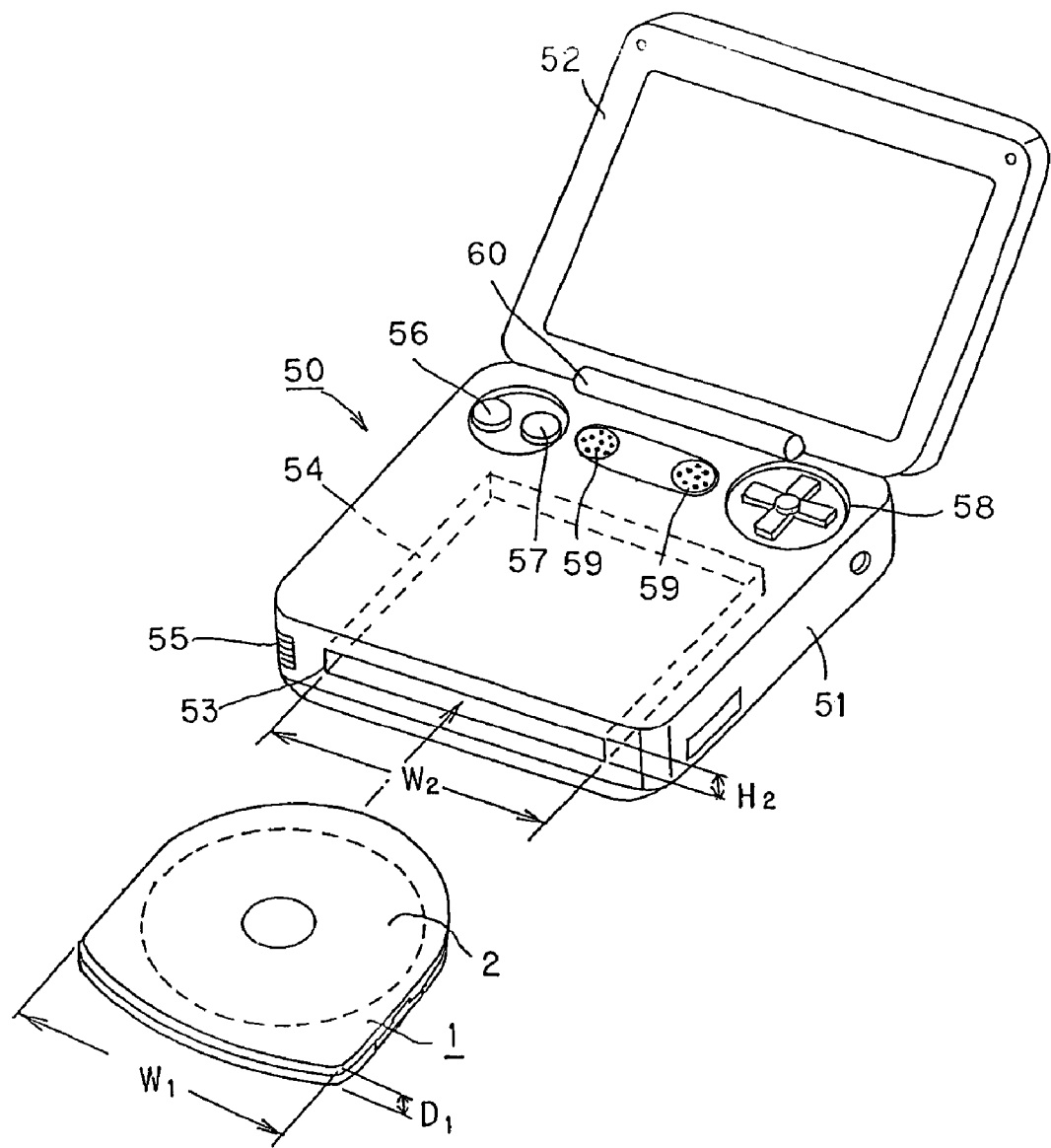
FIG. 15 is a perspective view showing an example of a disc drive device employing a disc cartridge according to the present invention.

Within the main body unit of the apparatus 51 of a disc driving device 50, having enclosed therein the disc driving unit, shown in FIG. 15, there is provided a cartridge loading unit, not shown, including a cartridge holder for loading the disc cartridge 1 thereon. In the front surface, forming one of the lateral sides of the main body unit of the apparatus 51, there is formed a cartridge inserting/ejecting opening 53 for inserting the disc cartridge 1 into a cartridge holder and for ejecting the disc cartridge 1 loaded in the cartridge holder. The cartridge inserting/ejecting opening 53 is formed as an opening just large enough to permit insertion/removal of the disc cartridge 1, and has a width W2 and a height H2 slightly larger than the width W1 and a thickness D1, respectively, of the disc cartridge 1 inserted therein. Within the main body unit of the apparatus 51, there is arranged a cartridge holder 54 facing the cartridge inserting/ejecting opening 53.

On one side of the front surface of the main body unit of the apparatus 51, there is mounted an ejection button 55 for ejecting the disc cartridge 1 held by the cartridge holder 54.

On one side of the upper surface of the main body unit of the apparatus 51, there are provided actuating buttons 56, 57 of a control switch, used for carrying out e.g. a TV game. On the other side thereof, a control key 58 for scrolling the image demonstrated on the display 52. There is also provided a loudspeaker 59 for radiating audio signals reproduced from the optical disc 2.

Although not shown, a control bobbin for e.g. a reproducing button, for controlling the disc driving unit, and an actuating button for a power supply switch, are provided to the main body unit of the apparatus 51.

The display 52 is provided on the back side, opposite to the front side, carrying the cartridge inserting/ejecting opening 53 of the main body unit of the apparatus 51, for swinging relative to the main body unit of the apparatus 51 via a hinge unit 60. The display 52 may be swung towards the main body unit of the apparatus 51 so as to be superposed on the upper surface thereof. The display 52 is formed by a liquid crystal display panel.

The state in which the disc cartridge 1 according to the present invention is loaded on the disc driving unit 50, constructed as described above, is hereinafter explained.

For loading the disc cartridge 1 on the disc driving device 50, the disc cartridge 1 is inserted via the cartridge inserting/ejecting opening 53 into the main body unit of the apparatus 51, with the arcuate section 7 as the inserting side, so as to be held on the cartridge holder 54, as shown in FIG. 15.

Meanwhile, with the disc cartridge 1 according to the present invention, the inserting end thereof via the cartridge inserting/ejecting opening 53 is formed as the approximately semicircular arcuate section 7, so that, even when the disc cartridge 1 is inserted with a centerline P2 along the width-wise direction of the disc cartridge significantly inclined with respect to the centerline P1 along the width-wise direction of the cartridge inserting/ejecting opening 53, the disc cartridge can be smoothly inserted into the cartridge inserting/ejecting opening 53 and reliably held by the cartridge holder 54.

Figure 16:
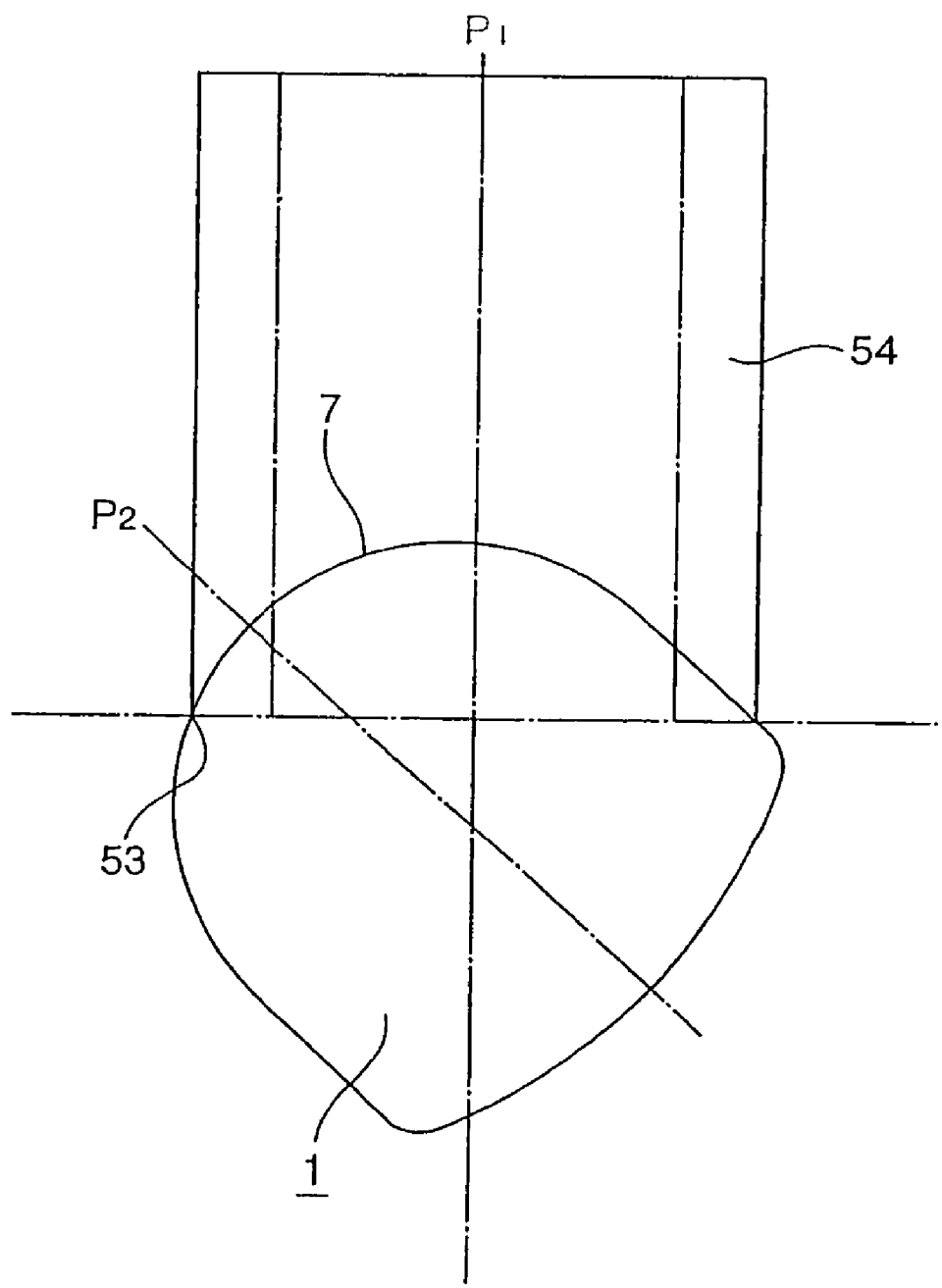
FIG. 16 is a plan view showing the state in which the disc cartridge is being inserted with a tilt into a cartridge insertion/ejecting opening of the disc driving unit.
Figure 17:
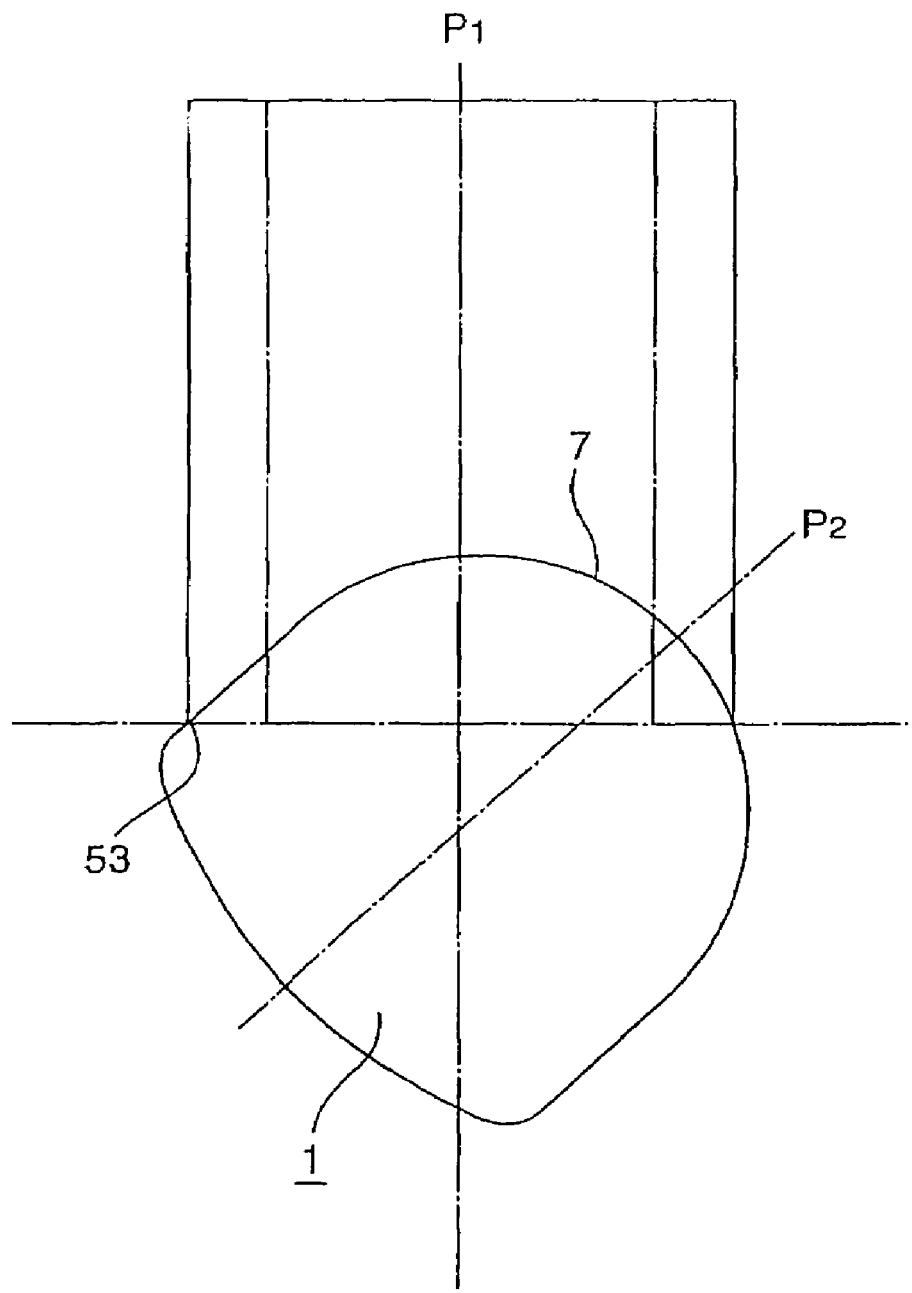
FIG. 17 is a plan view showing the state in which the disc cartridge is being inserted with a tilt in the opposite direction into a cartridge insertion/ejecting opening of the disc driving unit.
Figure 18:
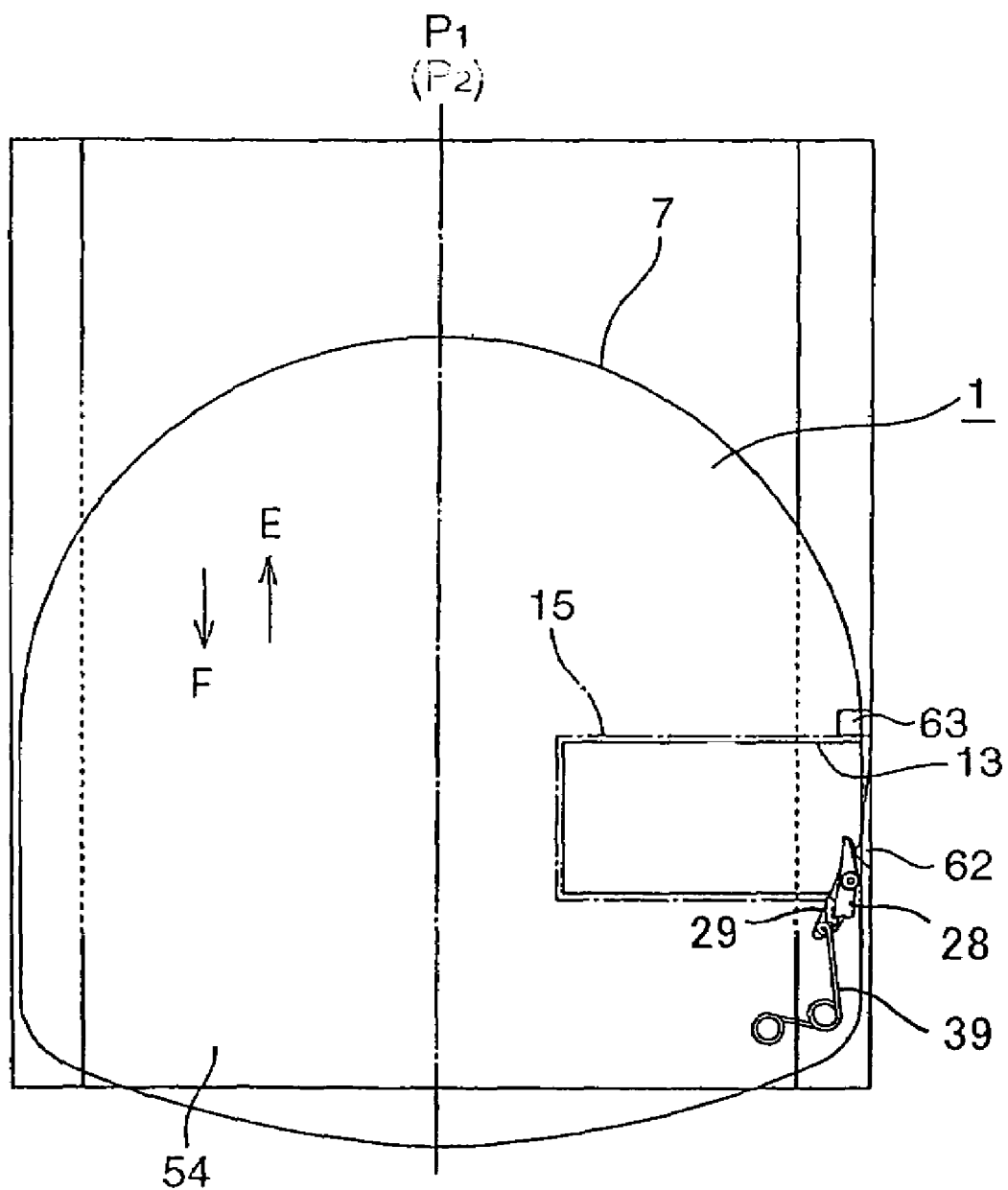
FIG. 18 is a plan view showing the state in which the disc cartridge has been inserted into a cartridge holder with a controlled orientation.

That is, the disc cartridge 1, having the inserting end formed as the approximately semicircular arcuate section 7, may be inserted into the main body unit of the apparatus 51 at the approximately semicircular arcuate section 7, even in case the disc cartridge 1 is inserted via the cartridge inserting/ejecting opening 53 with the width-wise centerline P2 inclined by an angle up to approximately 45° towards left or right of the width-wise centerline P1 of the cartridge inserting/ejecting opening 53, as shown in FIG. 16 or 17. At this time, the disc cartridge 1 may be corrected in its orientation by rotating it in a direction causing the coincidence of the centerlines P1 and P2, in the course of the insertion thereof through the cartridge inserting/ejecting opening 53, with the portion of the arcuate section 7, abutting against one of the lateral sides of the cartridge inserting/ejecting opening 53, as the center of rotation, as shown in FIG. 18. Thus, the disc cartridge 1, according to the present invention, may reliably be inserted into the cartridge holder 54, even in case the inserting direction thereof through the cartridge inserting/ejecting opening 53 is inclined significantly.

Figure 19:
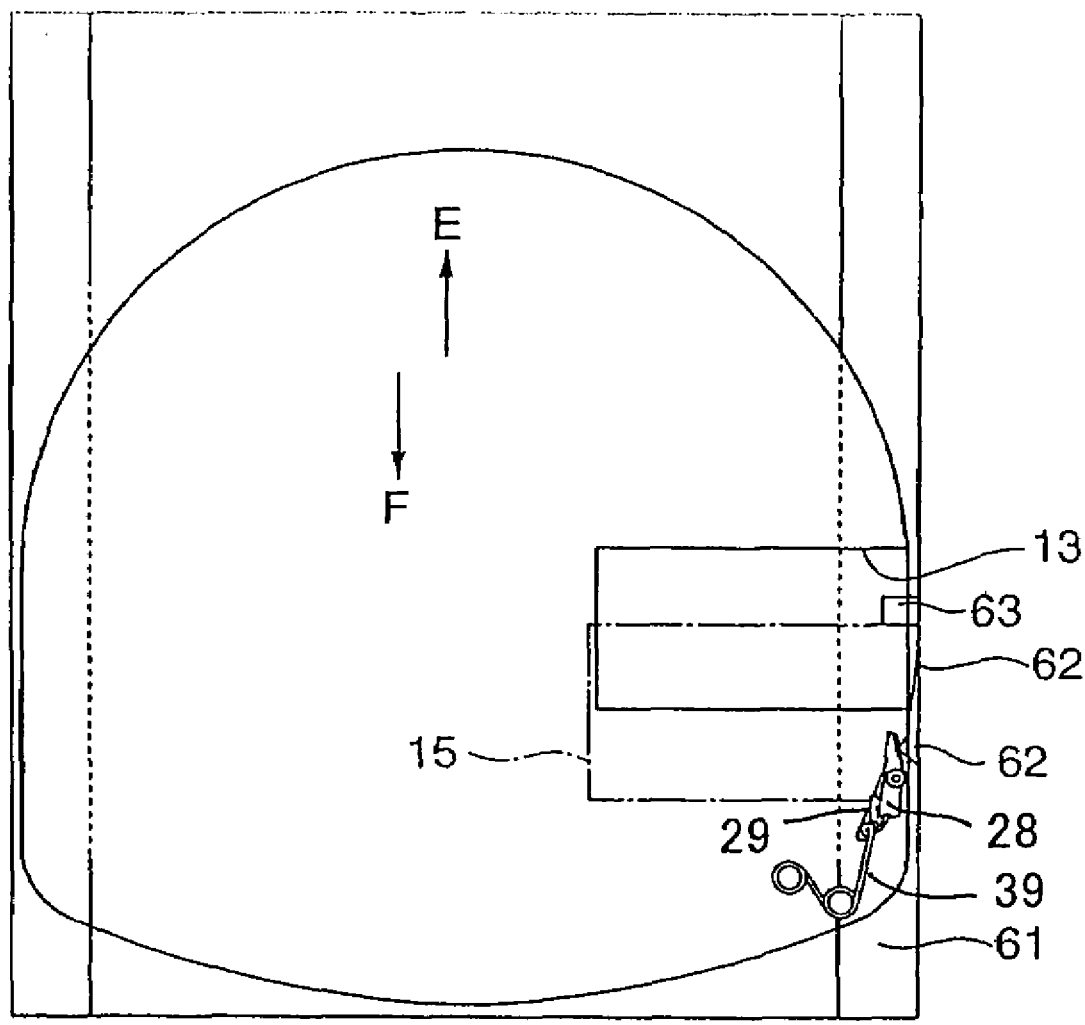
FIG. 19 is a plan view showing the state in which the disc cartridge has been inserted into a cartridge holder to unlock the shutter unit.

The disc cartridge 1, inserted into the cartridge holder 54, is further introduced into the cartridge holder 54, whereby the shutter unit 15 is moved relative to the main body unit of the apparatus 51 to open the aperture for the head part 13. That is, when the disc cartridge 1 has been introduced halfway in the cartridge holder 54, as shown in FIG. 19, a portion of a shutter unit movement inhibit spring 62, formed by segmenting a part of the sidewall section of an L-shaped cartridge retention part 61 in one lateral side of the cartridge holder 54, is intruded into the window 33 formed in the connecting piece 21 of the shutter unit 15, thereby thrusting the thrust part 30 to cause rotation of the lock lever 28 in the direction indicated by arrow D in FIG. 9, as described previously. When rotated in the direction indicated by arrow D in FIG. 9, the lock lever 28 is disengaged from the mating engaging part 29 of the engagement piece 31 to release the lock of the shutter unit 15 with respect to the main cartridge body unit 5. When unlocked from the main cartridge body unit 5, the shutter unit 15 is movable relative to the main cartridge body unit 5.

The cartridge holder 54, on which is loaded the disc cartridge 1 according to the present invention, is further provided with a shutter releasing piece 63. This shutter releasing piece 63 is intruded into a guide groove 49, formed in the lateral surface 8 of the main cartridge body unit 5, until it abuts against the lateral side of the shutter unit 15.

Figure 20:
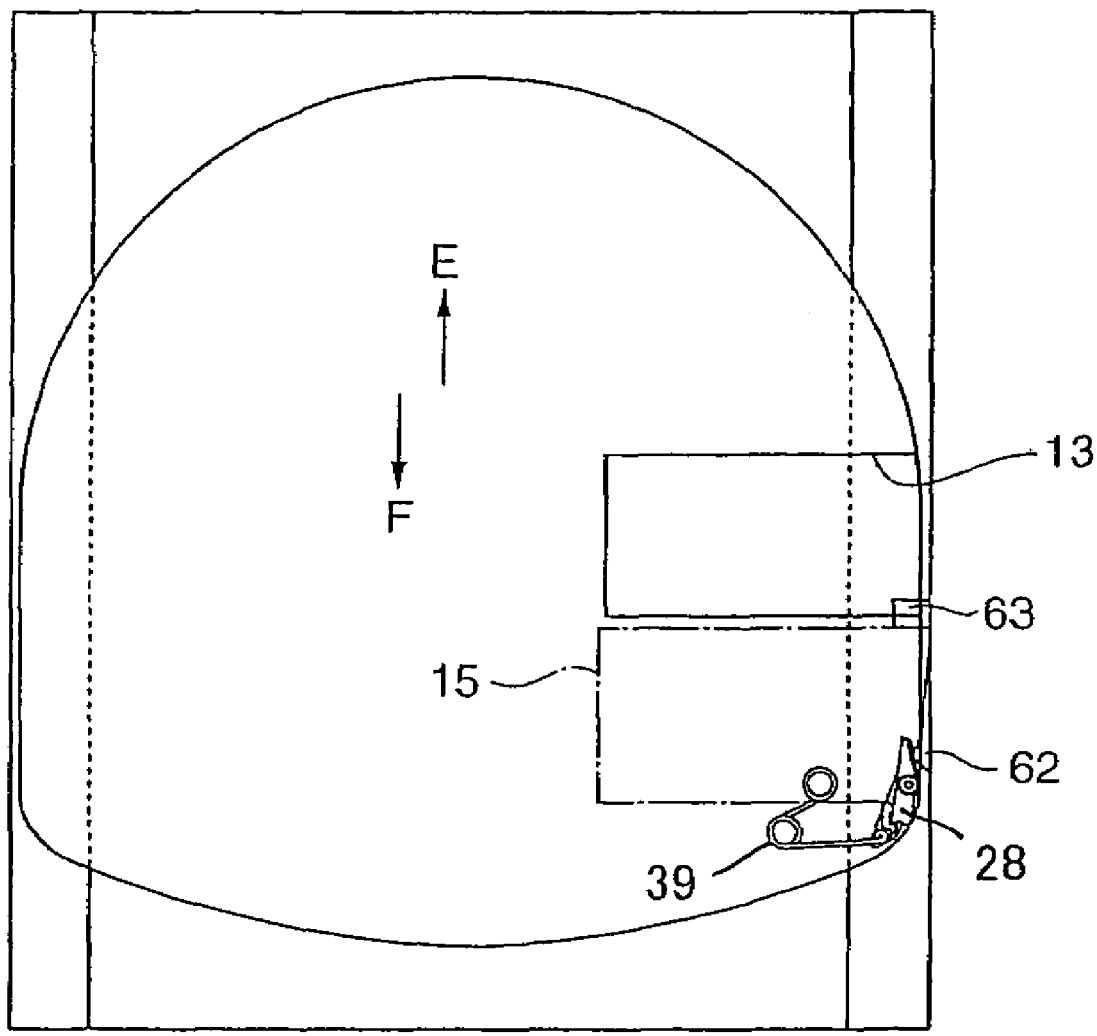
FIG. 20 is a plan view showing the state in which the disc cartridge has been inserted into a cartridge holder and the shutter unit has been moved to open the recording and/or reproducing aperture.

When inserted into the inside of the cartridge holder 54, until unlocking of the shutter unit 15, the shutter releasing piece 63 abuts against the lateral side of the shutter unit 15, to inhibit the movement of the shutter unit 15 relative to the main cartridge body unit 5, as shown in FIG. 19. When the disc cartridge 1 is further intruded from the position shown in FIG. 19 towards the inner part of the cartridge holder 54, in the direction indicated by arrow E, the main cartridge body unit 5 is moved along the direction as indicated by arrow E, thereby opening the aperture for the head part 13, as shown in FIG. 20.

If, as the movement of the shutter unit 15 is inhibited, the disc cartridge 1 is moved in the direction indicated by arrow E in FIG. 19, with the main cartridge body unit 5 then opening the aperture for the head part 13, the torsion coil spring 39, forming the shutter opening/closure unit 38, is biased, as described above with reference to FIGS. 9 and 10. When the main cartridge body unit 5 is moved in the direction indicated by arrow E in FIG. 19, such that the coil part 39c surpasses the location of the support pin 42, lying along the direction of movement of the shutter unit 15, thus biasing the torsion coil spring 39, the biasing direction of the torsion coil spring 39 is reversed. The shutter unit 15 is then moved in the direction of arrow F in FIG. 18, opposite to the direction of movement of the main cartridge body unit 5, thus opening the aperture for the head part 13, as shown in FIGS. 11, 12 and 18. At this time, the shutter unit 15 is biased by the torsion coil spring 39 for opening the aperture for the head part 13, thus reliably retaining the aperture for the head part 13 in the opened state.

The disc cartridge 1, inserted into the cartridge holder 54, with the aperture for the head part 13 opened by the above-described operation, is loaded in position on the cartridge loading section, provided in the disc driving device 50. At this time, the optical disc 2 is loaded in position in a disc driving unit. This disc driving unit is then actuated to reproduce the program data recorded on the optical disc 2 to run the program.

For ejecting the disc cartridge 1, loaded on the disc driving device 50, after reproducing the optical disc 2, an ejection button 55 is pressed. On pressing the ejection button 55, the disc cartridge 1, loaded on the cartridge loading section, is ejected. After the ejection operation is carried out, the shutter unit 15 is moved relative to the main cartridge body unit 5 to revert to the initial position of closing the aperture for the head part 13 to lock the shutter unit 15 in this position of closing the aperture for the head part 13, by the reverse of the operation, described above. By this operation of restoring the shutter unit 15 to the closure position, the disc cartridge is ejected via the cartridge loading/unloading opening 53, so that the ejection of the disc cartridge 1, loaded on the disc driving device 50, comes to a close.

Meanwhile, the cartridge loading section 67 is mounted on a base 69 carrying a disc rotating driving unit 65 and an optical pickup 68 for reproducing the data recorded on the optical disc 2. The cartridge loading section 67 is provided with a positioning pin 70 for positioning the disc cartridge 1 in the planar direction and a positioning lug, not shown, for positioning the disc cartridge 1 in the height-wise direction. The disc cartridge 1 is loaded on the cartridge loading section 67, as it is positioned in the planar and height-wise directions, by the positioning pin 70 engaging in each of the first and second positioning holes 43, 44 and by the lower surface being supported by the height positioning lug.

With the disc cartridge 1 of the present invention, the portion facing the aperture for the head part 13 of the upstanding peripheral wall section 4a of the lower cartridge half 4 is formed with the cut-out 25 and thereby opened.

At least the portion facing the aperture for the head part 13 of the slide guide 18 carrying the shutter unit 15 provided to the upper cartridge half 3 is of a height H1 not protruding from the lower surface 2a of the optical disc 2 facing the lower cartridge half 4, as shown in FIG. 7, when the optical disc 2 in the disc cartridge 1, loaded in position in the height-wise direction on the cartridge loading section 67 has been loaded in position on the turntable 6.

Figure 21:
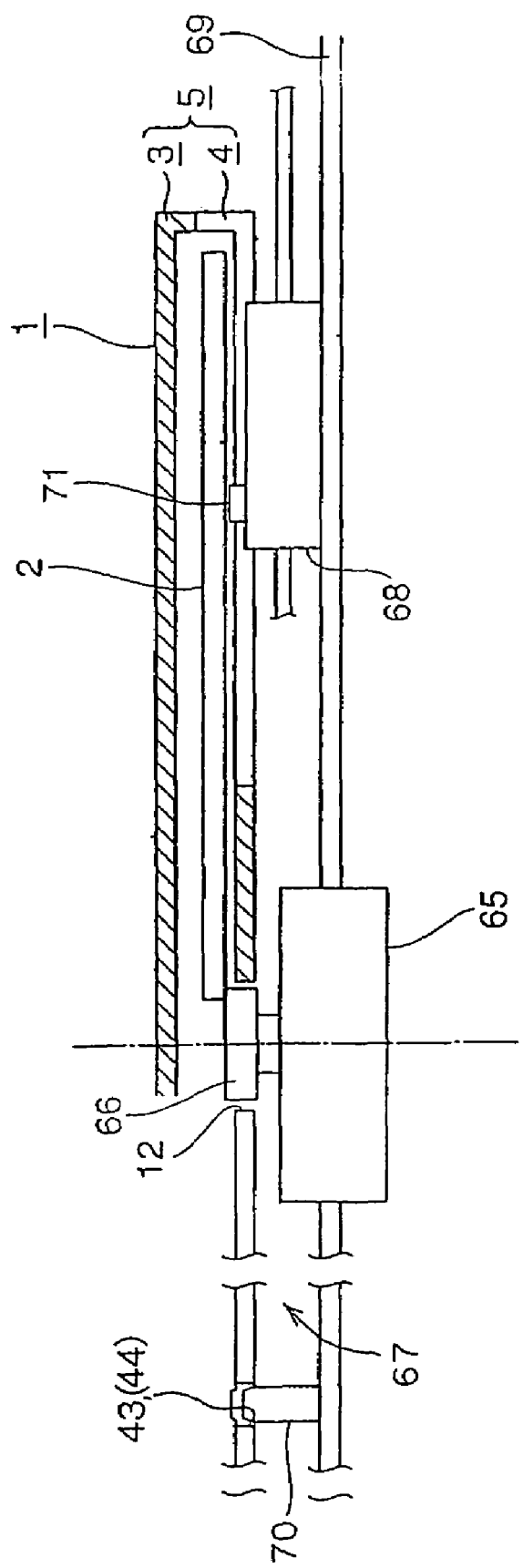
FIG. 21 is a plan view showing the state in which the disc cartridge has been loaded into a cartridge holder to reproduce the optical disc.
Figure 22:
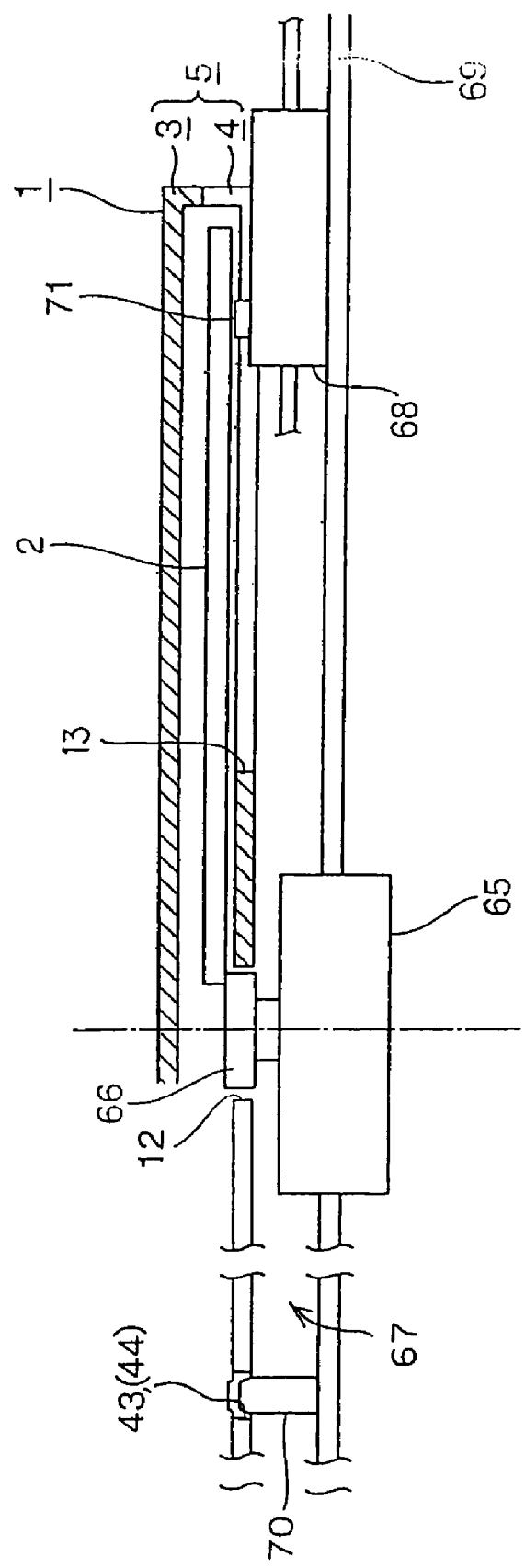
FIG. 22 is a cross-sectional side view showing the state in which an optical pickup has been moved to the outer rim side of the optical disc housed in the disc cartridge loaded on a cartridge loading section.

The disc cartridge 1, constructed as described above, is able not only to locate an entire optical pickup 68, as a head part for reading out information signals, recorded on the optical disc, within the main cartridge body unit 5, as shown in FIG. 21, when the shutter unit 15 has been moved to open the aperture for the head part 13, but also to locate the components of the optical block 72, other than an objective lens 71, condensing the light beam, scanning the signal recording area of the optical disc 2, outwardly of the main cartridge body unit 5, as the objective lens 71 is located within the main cartridge body unit 5, as shown in FIG. 22, when the optical pickup 68 has been moved to a position scanning the outer rim of the optical disc 2.

As a result, with the disc cartridge 1, according to the present invention, the optical pickup 68 may be located at an optional position across the inner and outer rims of the main cartridge body unit 5, as the optical pickup is kept in proximity to the optical disc 2, and hence the signal recording area may be provided up to the outer rim of the optical disc 2, thus increasing the recording capacity of the optical disc 2. Moreover, since the optical pickup 68 may be located in proximity to the optical disc 2, the numerical aperture NA of the objective lens 71 may be increased, and hence the beam spot of the light beam condensed on the signal recording area of the optical disc 2 may be reduced, thereby improving the recording density of the information signals recorded on the optical disc 2. In addition, since the recording density may be improved with increase in the recording capacity, the optical disc 2 of a preset recording capacity may be reduced in size. The optical disc 2 may be scanned as the optical pickup 68 is located at an optional position across the inner and outer rims of the main cartridge body unit 5, the main cartridge body unit 5 and hence the recording and/or reproducing apparatus employing it may be reduced in size.

Although the disc cartridge 1 having the replay-only optical disc 2 housed therein has been explained in the foregoing, the present invention may similarly be applied to a recording and/or reproducing optical disc adapted for re-recording the information signals or other types of the recording mediums with comparable merits.

The present invention is not limited to the embodiments described above with reference to the drawings, such that various modifications or substitutions that may be apparent to those skilled in the art may be implemented without departing from the scope of the invention as set forth and defined in the claims.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A disc cartridge comprising a disc; and a main cartridge body unit having said disc rotatably housed therein;

one lateral surface of said main cartridge body unit being a substantially semicircular arcuate section having a center of said disc housed in said main cartridge body unit as a center thereof, wherein a back side of said main cartridge body unit opposite said arcuate section is a curved section having a curvature smaller than a curvature of said arcuate section wherein an engagement recess engaged by a part of an ejection unit provided to a recording and/or reproducing apparatus loaded with the disc cartridge is formed in the lateral side of the main cartridge body unit carrying said arcuate section, and wherein a cut-out portion opened in an opposite direction to an inserting direction is formed on a side of said engagement recess opposite to the inserting direction into the recording and/or reproducing apparatus.

2. The disc cartridge according to claim 1, wherein said arcuate section is formed on an inserting side of said main cartridge body unit into a recording and/or reproducing apparatus.

3. The disc cartridge according to claim 2, wherein the curved section is opposite to an inserting end of said main cartridge body unit.

4. The disc cartridge according to claim 1, wherein said main cartridge body unit includes a recording and/or reproducing aperture for exposing at least a portion of a signal recording area of said disc to outside across an inner rim and an outer rim of the disc and wherein said recording and/or reproducing aperture is formed for being opened in a lateral side of said main cartridge body unit other than the lateral side formed as said arcuate section.

5. The disc cartridge according to claim 4, wherein a shutter unit for opening/closing said recording and/or reproducing aperture is movably mounted to said main cartridge body unit.

6. The disc cartridge according to claim 5, wherein said shutter unit is moved along a lateral side of said main cartridge body unit other than said arcuate section of said main cartridge body unit for opening closing said recording and/or reproducing aperture.

7. The disc cartridge according to claim 6, wherein the lateral side along which is moved said shutter unit is a side parallel to a movement direction of said shutter unit.

8. The disc cartridge according to claim 1, wherein another engagement recess is formed in a lateral side of said main cartridge body unit carrying said engagement recess.

9. The disc cartridge according to claim 8, wherein a recording and/or reproducing aperture for exposing at least a portion of said disc is formed in said main cartridge body unit, and wherein said recording and/or reproducing aperture is formed for being opened in a lateral surface of said main cartridge body unit, formed with said engagement recess, other than the lateral side carrying said arcuate section of the main cartridge body unit.

10. A disc cartridge comprising a disc; and a main cartridge body unit having said disc rotatably housed therein;

one lateral surface of said main cartridge body unit being a substantially semicircular arcuate section having a center of said disc housed in said main cartridge body unit as a center thereof, wherein an engagement recess engaged by a part of an ejection unit provided to a recording and/or reproducing apparatus loaded with the disc cartridge is formed in the lateral side of the main cartridge body unit carrying said arcuate section, and wherein a cut-out portion opened in an opposite direction to an inserting direction is formed on a side of said engagement recess opposite to the inserting direction into the recording and/or reproducing apparatus.

11. The disc cartridge according to claim 10, wherein another engagement recess is formed in a lateral side of said main cartridge body unit carrying said engagement recess.

12. The disc cartridge according to claim 11, wherein a recording and/or reproducing aperture for exposing at least a portion of said disc is formed in said main cartridge body unit, and wherein said recording and/or reproducing aperture is formed for being opened in a lateral surface of said main cartridge body unit, formed with said engagement recess, other than the lateral side carrying said arcuate section of the main cartridge body unit.

* * * * *